United States Patent
Shiraishi et al.

(10) Patent No.: US 11,256,942 B2
(45) Date of Patent: Feb. 22, 2022

(54) OBJECT RECOGNITION SYSTEM, OBJECT CONTROL DEVICE, OBJECT RECOGNITION DEVICE, OBJECT RECOGNITION METHOD, OBJECT CONTROL METHOD, AND RECORDING MEDIUM

(71) Applicant: NEC Corporation, Tokyo (JP)

(72) Inventors: Soma Shiraishi, Tokyo (JP); Shoji Yachida, Tokyo (JP)

(73) Assignee: NEC CORPORATION, Tokyo (JP)

(*) Notice: Subject to any disclaimer, the term of this patent is extended or adjusted under 35 U.S.C. 154(b) by 527 days.

(21) Appl. No.: 16/314,171

(22) PCT Filed: Jul. 3, 2017

(86) PCT No.: PCT/JP2017/024360
§ 371 (c)(1),
(2) Date: Dec. 28, 2018

(87) PCT Pub. No.: WO2018/008595
PCT Pub. Date: Jan. 11, 2018

(65) Prior Publication Data
US 2021/0232840 A1 Jul. 29, 2021

(30) Foreign Application Priority Data
Jul. 4, 2016 (JP) .............................. JP2016-132658

(51) Int. Cl.
*G06K 9/20* (2006.01)
*G06K 9/46* (2006.01)
(Continued)

(52) U.S. Cl.
CPC ......... *G06K 9/2027* (2013.01); *G06K 9/3216* (2013.01); *G06K 9/4652* (2013.01); *H04N 5/232* (2013.01)

(58) Field of Classification Search
CPC .. G06K 9/2027; G06K 9/3216; G06K 9/4652; H04N 5/232; G06T 7/00
See application file for complete search history.

(56) References Cited

U.S. PATENT DOCUMENTS

2016/0267647 A1* 9/2016 Higo ..................... G06T 7/0004

FOREIGN PATENT DOCUMENTS

| CN | 205175876 | * | 4/2016 | ............ G01N 15/02 |
| JP | 2009-238454 A | | 10/2009 | |

(Continued)

OTHER PUBLICATIONS

International Search Report dated Sep. 26, 2017, in corresponding PCT International Application.

*Primary Examiner* — Siamak Harandi

(57) ABSTRACT

The object recognition system comprises: a detection unit for detecting a moving target object as an object to be recognized; an imaging unit for capturing a moving image of the target object; a control unit for controlling the state of objects, the state of which can be changed in a capturing area of the imaging unit, on the basis of the output of the detection unit such that a change in light quantity or hue between captured images due to the change in the state of the objects falls within a predetermined range; an identification unit for, upon detecting the change in the state of the objects included in the moving images, identifying a captured image to be recognized; and a recognition unit for recognizing the target object included in the identified captured image.

9 Claims, 18 Drawing Sheets

(51) Int. Cl.
*H04N 5/232* (2006.01)
*G06K 9/32* (2006.01)

(56) References Cited

FOREIGN PATENT DOCUMENTS

| | | |
|---|---|---|
| JP | 2010-236891 A | 10/2010 |
| JP | 2012-103074 A | 5/2012 |
| JP | 2016-105225 A | 6/2016 |

* cited by examiner

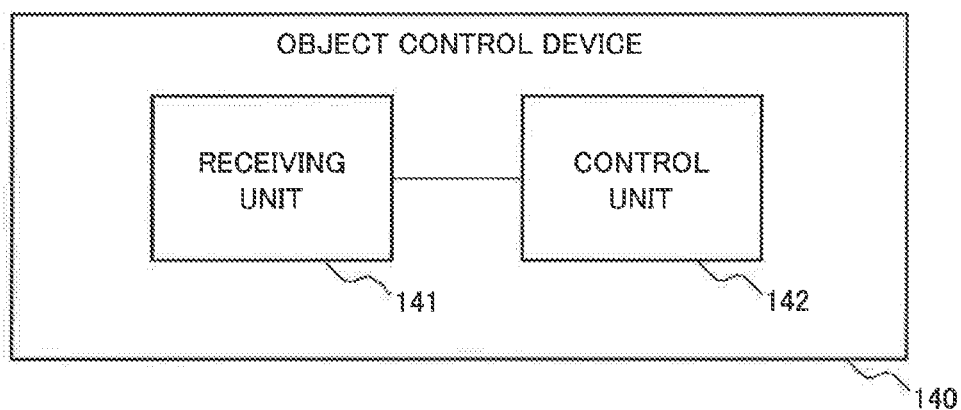
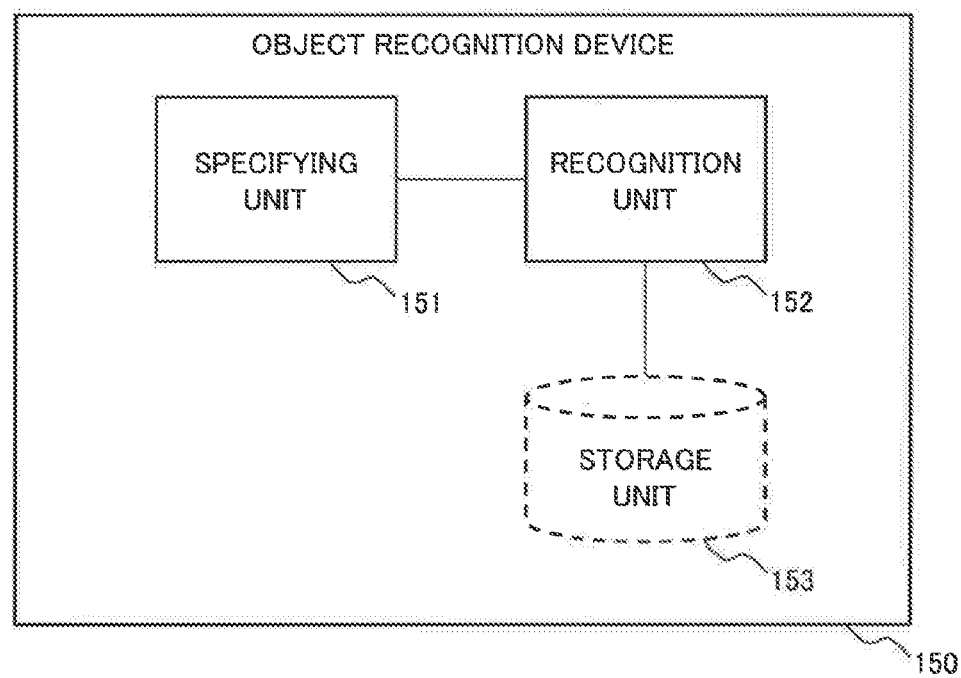

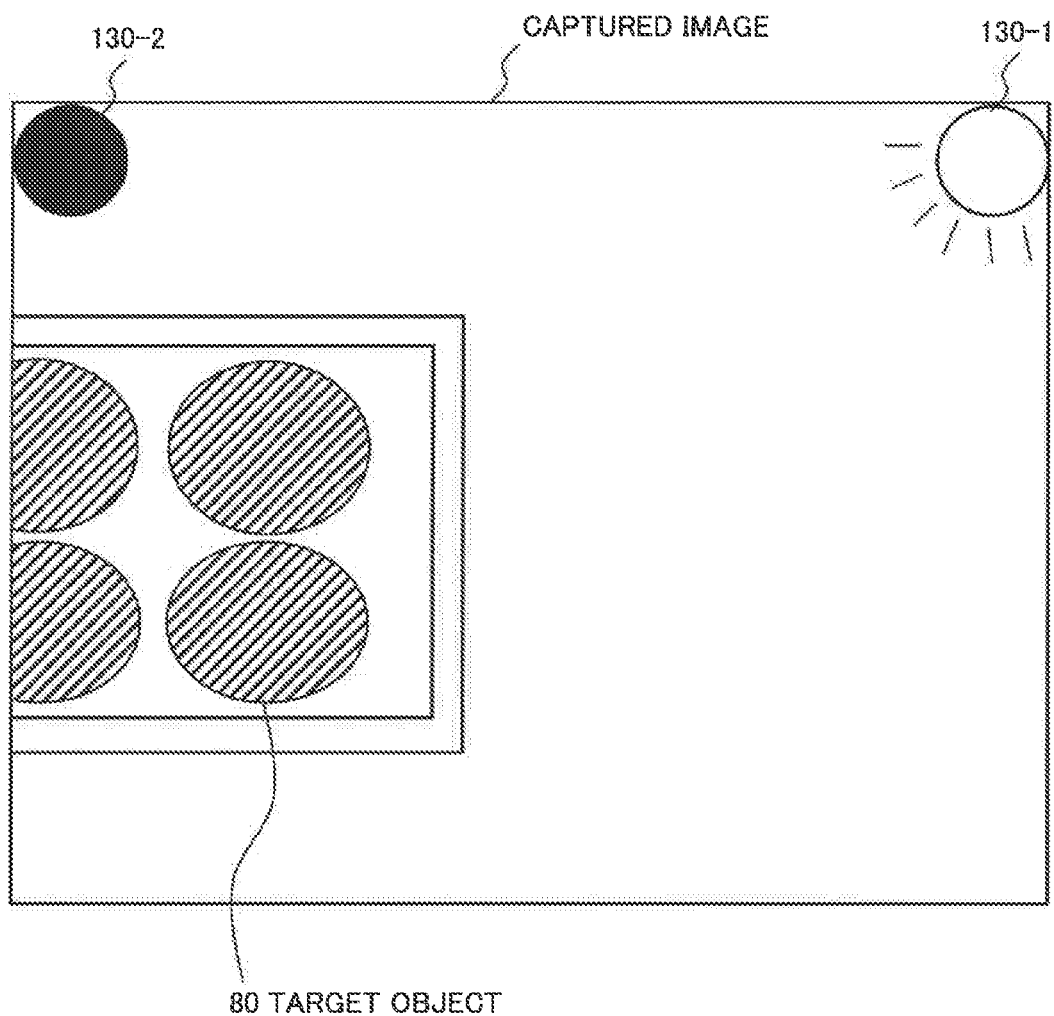

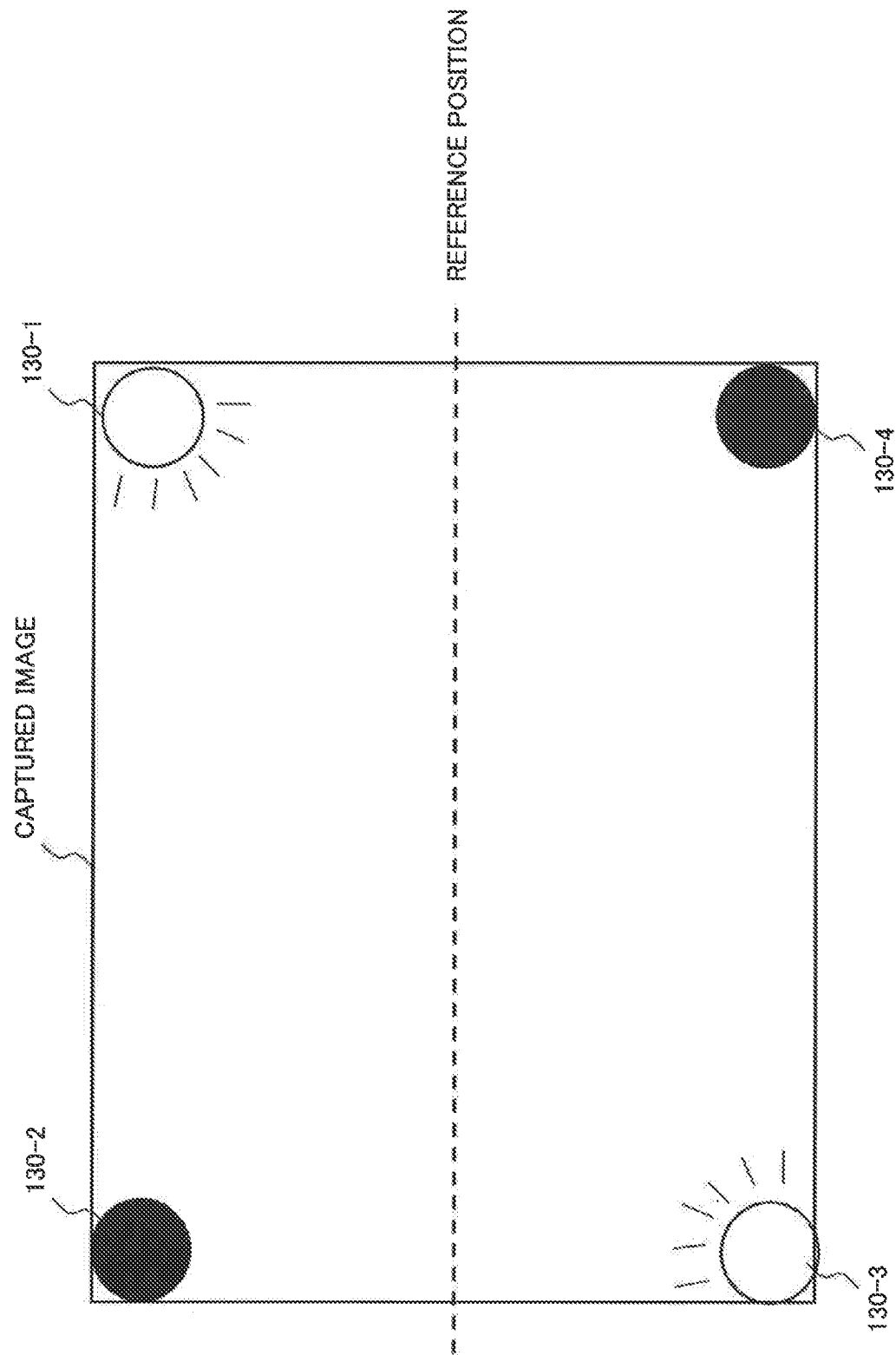

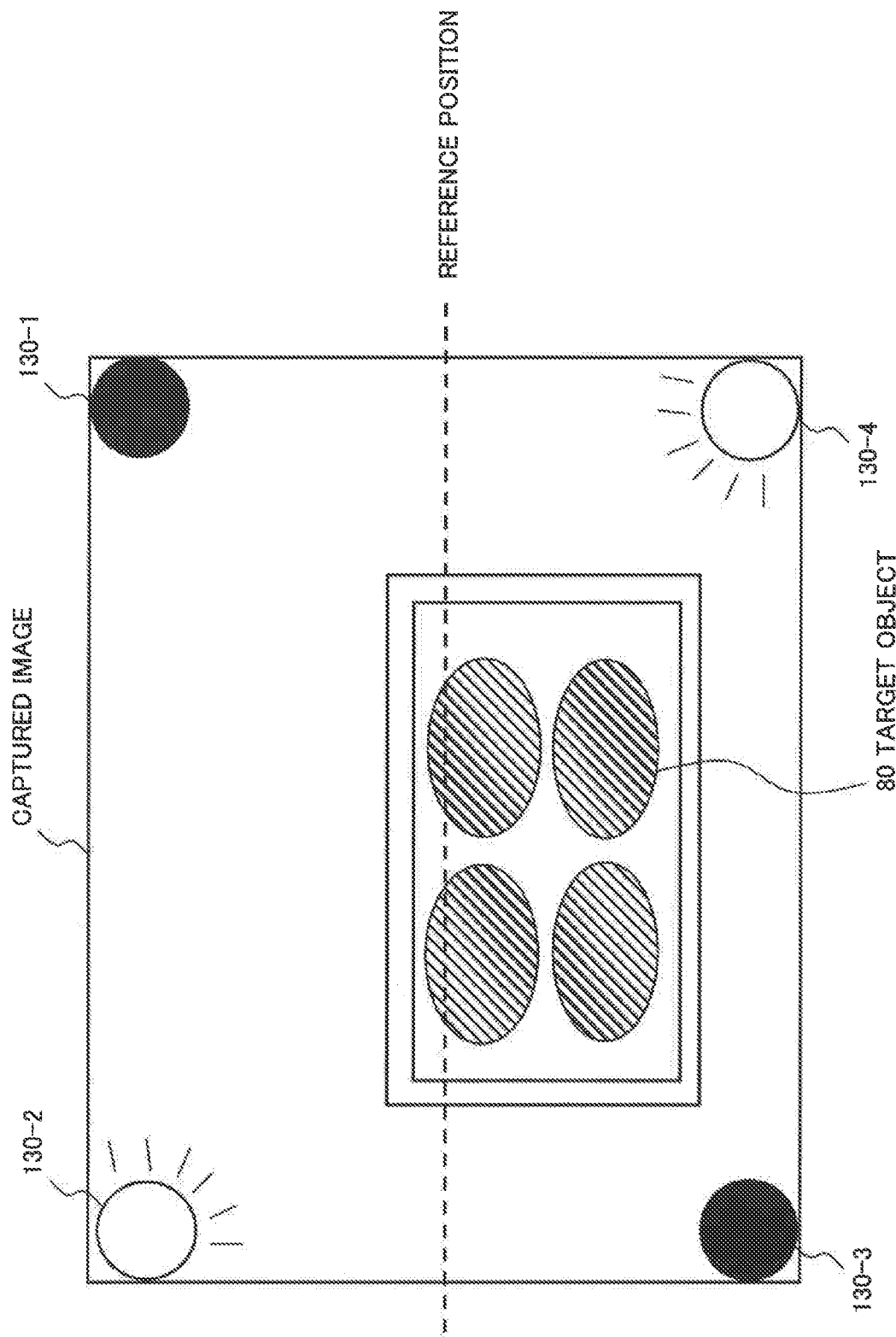

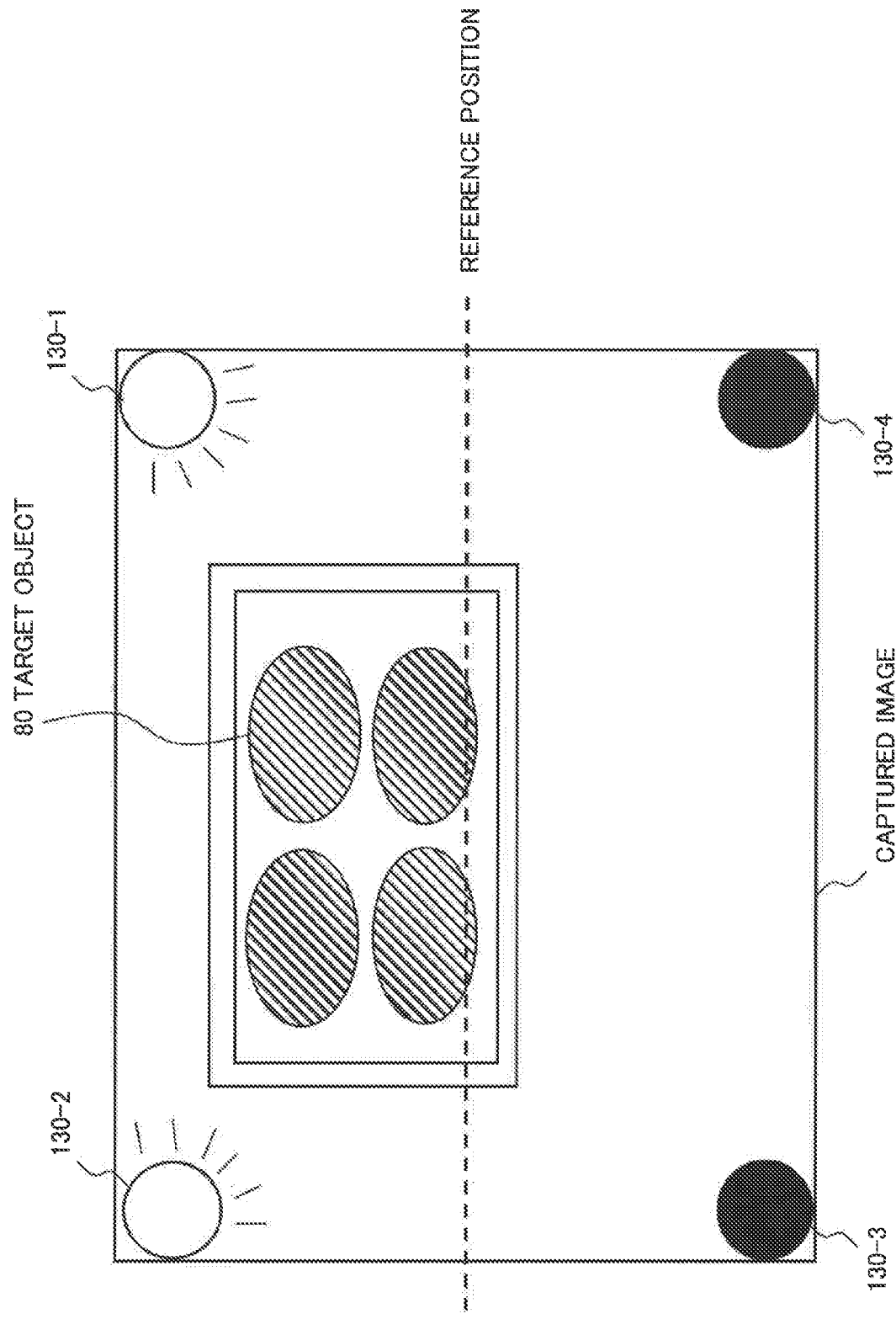

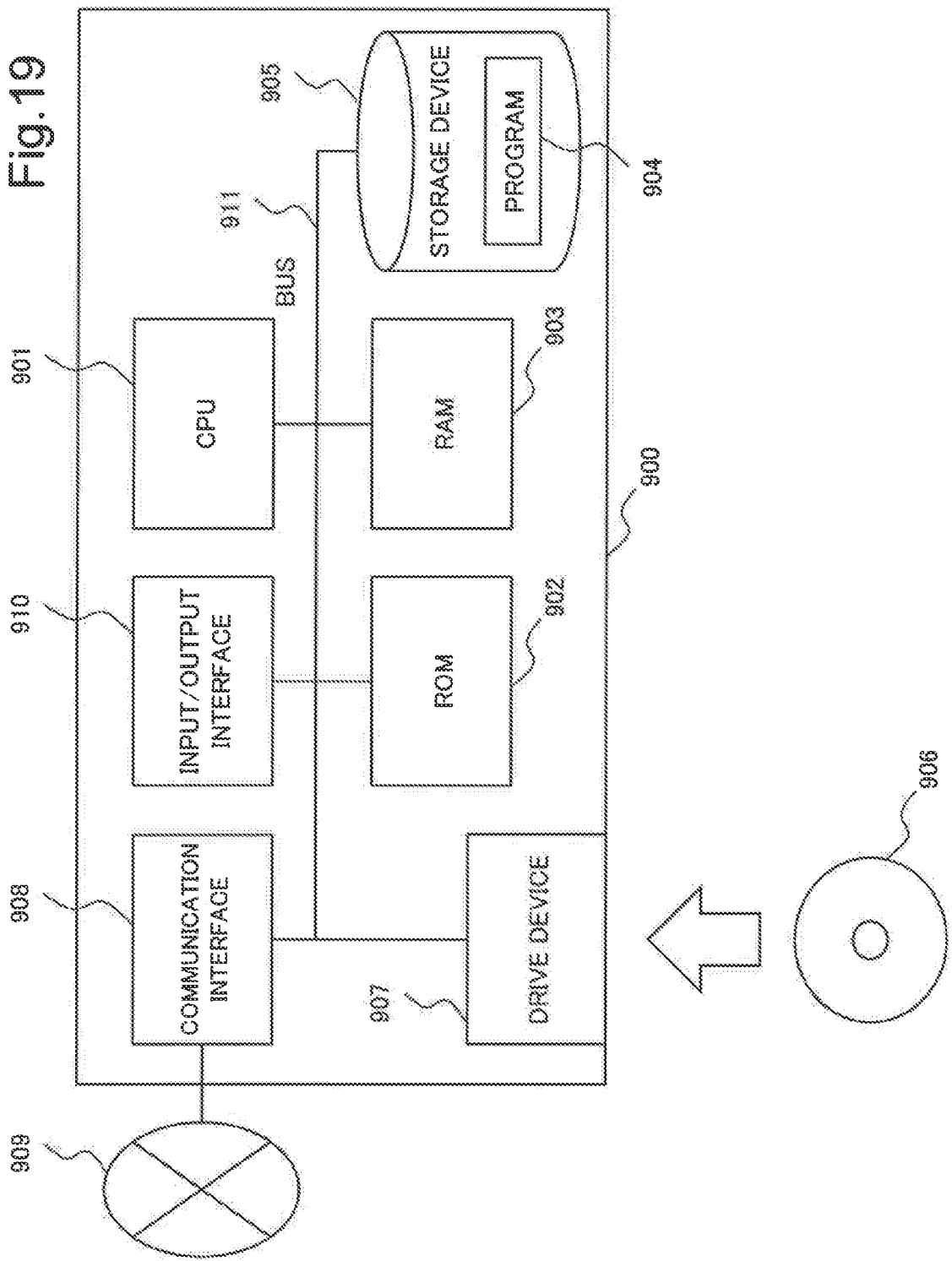

OBJECT RECOGNITION SYSTEM, OBJECT CONTROL DEVICE, OBJECT RECOGNITION DEVICE, OBJECT RECOGNITION METHOD, OBJECT CONTROL METHOD, AND RECORDING MEDIUM

CROSS-REFERENCE TO RELATED PATENT APPLICATIONS

This application is a National Stage Entry of International Application No. PCT/JP2017/024360, filed Jul. 3, 2017, which claims priority from Japanese Patent Application No. JP 2016-132658, filed Jul. 4, 2016. The entire contents of the above-referenced applications are expressly incorporated herein by reference.

TECHNICAL FIELD

The present disclosure relates to an object recognition system, an object control device, an object recognition device, an object recognition method, an object control method, and a recording medium.

BACKGROUND ART

There is a method of associating a captured image with a position of a target object included in the captured image, when each captured image included in a moving image to be taken is used for recognition processing. As one example of the association, PTL 1, for example, describes a method of associating a position of a vehicle with a captured image, by flashing a light source unit, based on time, by an in-vehicle device that calculates a precise position and the time, and recording a time stamp in a captured image taken by a imaging device that captures a vehicle.

CITATION LIST

Patent Literature

[PTL 1] Japanese Unexamined Patent Application Publication No. 2010-236891

SUMMARY OF INVENTION

Technical Problem

However, with a technique described in PTL 1, there is a possibility that a change in luminance or color occurs in a captured image due to flashing of the light source unit. In such a case, for example, there is a possibility that brightness or tint of the whole captured image changes with a camera having a function of automatically correcting exposure. Therefore, when recognition processing is performed by use of such a captured image, there is a possibility that precision of recognition deteriorates.

As a method of associating a position of a target object with a captured image, there is a method in which an imaging device images a target object by use of a sensor with an output of the sensor as a trigger. However, such a method needs an imaging device being capable of receiving an output from a sensor. Moreover, even when an imaging device can receive an output from a sensor, there is a possibility that a difference is made between a clock included in the imaging device and a clock included in the sensor, and precision of association of a position of a target object with a captured image deteriorates. Thus, there is a possibility that a suited captured image cannot be specified as a recognition target. Therefore, even when such a method is employed, there is a possibility that precision of recognition deteriorates.

It is conceivable to perform recognition processing for all captured images in order to raise recognition precision. In such a case, a processing amount of recognition processing increases, and therefore, a load is imposed on a device which performs recognition processing. Moreover, in order not to impose a load, it is necessary to use a high-performance device, and introduction cost is needed.

The present disclosure has been made in view of the above-described problems, and an object thereof is to provide a technique being capable of reducing cost taken for recognition, with high recognition precision.

Solution to Problem

An aspect of the invention is an object recognition system. The object recognition system includes: detection means for detecting a moving target object to be a recognition target; imaging means for capturing a moving image of the target object; an object being changeable in state within a capturing range of the imaging means; control means for controlling a state of the object, based on an output of the detection means, in such a way that a change in light quantity or hue between captured images due to a state change of the object falls within a certain range; specifying means for detecting a state change of the object being included in the moving image, and then specifying a captured image to be a recognition target; and recognition means for recognizing the target object included in the specified captured image.

An aspect of the invention is an object control device. The object control device includes receiving means for receiving a detection result of a moving target object to be a recognition target; and control means for controlling an object being changeable in state within a capturing range of the target object, based on the detection result, the control means controlling a state of the object in such a way that a change in light quantity or hue between captured images due to a state change of the object falls within a certain range.

An aspect of the invention is an object recognition device. The object recognition device includes specifying means for detecting, from a moving image of a moving target object that is an imaged target object to be a recognition target, a state change of an object controlled by an object control device, and then specifying a captured image to be a recognition target, the object control device controlling an object being changeable in state within a capturing range of the moving image, in such a way that a change in light quantity or hue between captured images due to a state change of the object falls within a certain range, the object control device controlling a state of the object, based on a detection result of the target object; and recognition means for recognizing the target object included in the specified captured image.

An aspect of the invention is an object recognition method in an object recognition system. The object recognition system includes a detection device, an imaging device, an object being changeable in state within a capturing range of the imaging device, an object recognition device, and an object control device. The object recognition method includes: by the detection device, detecting a moving target object to be a recognition target; by the imaging device, capturing a moving image of the target object; by the object control device, controlling a state of the object, based on an output of the detection, in such a way that a change in light quantity or hue between captured images due to a state change of the object falls within a certain range; by the object recognition device, detecting a state change of the object being included in the moving image, and then specifying a captured image to be a recognition target; and recognizing the target object included in the specified captured image.

An aspect of the invention is an object control method. The object control method includes receiving a detection result of a moving target object to be a recognition target; and controlling an object being changeable in state within a capturing range of the target object, based on the detection result, in such a way that a change in light quantity or hue between captured images due to a state change of the object falls within a certain range.

An aspect of the invention is an object recognition method. The object recognition method includes detecting, from a moving image of an imaged target object to be a recognition target, a state change of an object controlled by an object control device, and then specifying a captured image to be a recognition target, the object control device controlling an object being changeable in state within a capturing range of the moving image in such a way that a change in light quantity or hue between captured images due to a state change of the object falls within a certain range, the object control device controlling a state of the object, based on a detection result of the target object; and recognizing the target object included in the specified captured image.

Note that a computer program which achieves the above-described system, device, or method by a computer, and a computer-readable non-transitory recording medium in which the computer program is stored also fall within the present disclosure.

Advantageous Effects of Invention

According to the present disclosure, it is possible to reduce cost taken for recognition, with high recognition precision.

BRIEF DESCRIPTION OF DRAWINGS

FIG. 5 is a functional block diagram illustrating one example of a functional configuration of an object control device in the object recognition system according to the second example embodiment.

FIG. 6 is a functional block diagram illustrating one example of a functional configuration of an object recognition device in the object recognition system according to the second example embodiment.

FIG. 7 is a view illustrating one example of a captured image.

FIG. 16 is a view illustrating one example of a captured image.

FIG. 17 is a view illustrating one example of a captured image.

FIG. 18 is a view illustrating one example of a captured image.

FIG. 19 is a diagram exemplarily illustrating a hardware configuration of a computer (information processing device) being capable of achieving each example embodiment.

EXAMPLE EMBODIMENT

First Example Embodiment

Figure 1:
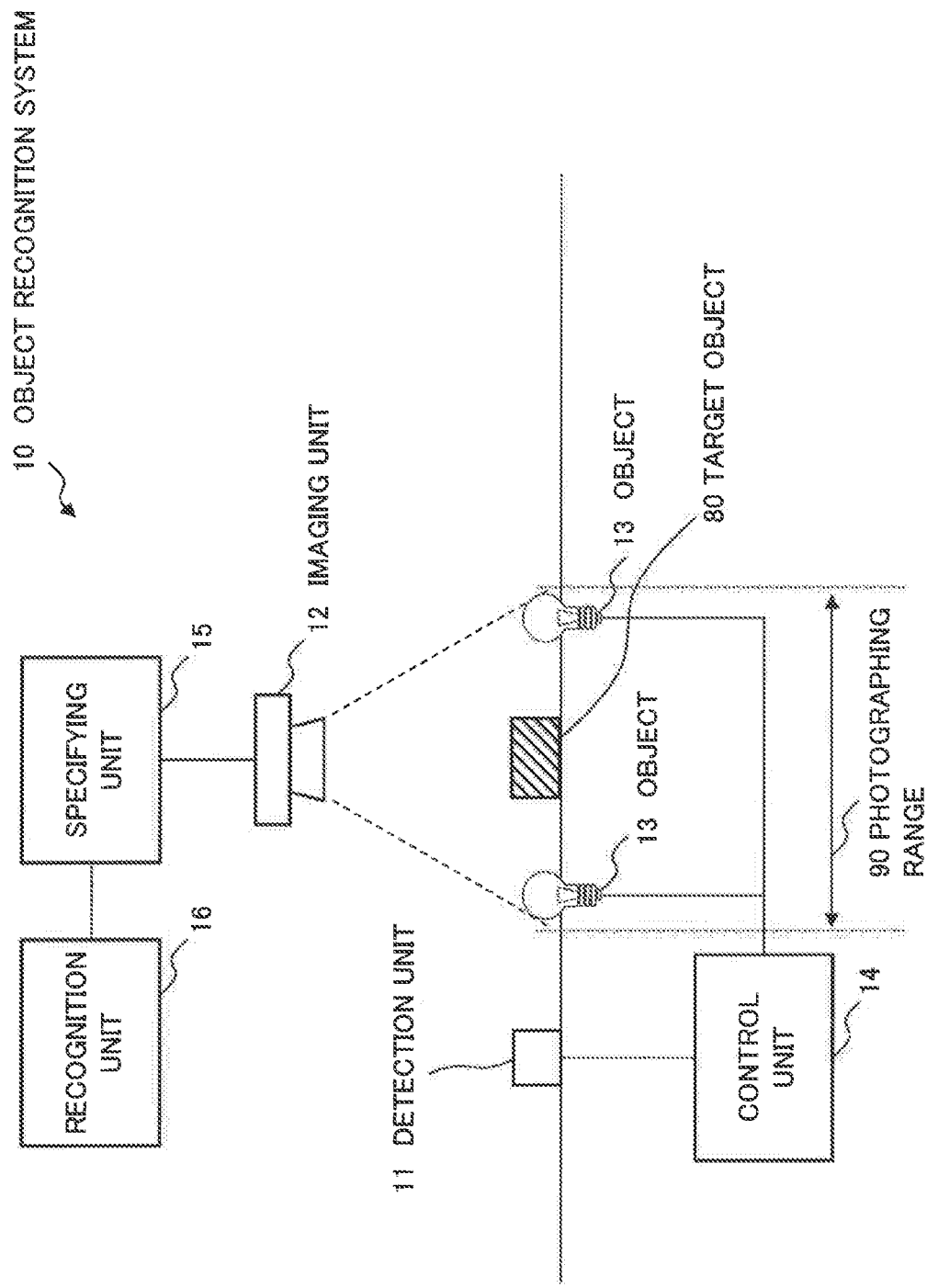
FIG. 1 is a diagram illustrating one example of a configuration of an object recognition system according to a first example embodiment.

A first example embodiment of the present disclosure is described with reference to the drawings. FIG. 1 is a diagram illustrating one example of a configuration of an object recognition system 10 according to the present example embodiment. As illustrated in FIG. 1, the object recognition system 10 according to the present example embodiment includes a detection unit 11, an imaging unit 12, an object 13, a control unit 14, a specifying unit 15, and a recognition unit 16.

The detection unit 11 detects a moving target object 80 to be a recognition target. The detection unit 11 is achieved by, for example, an infrared sensor or the like. Herein, the target object 80 may be mounted and thus move on, for example, a belt conveyer or the like, or may spontaneously move. Moreover, the target object 80 to be a recognition target is an amorphous object, and includes, for example, a mushroom. A mushroom has an amorphous shape. Therefore, even when a number of mushrooms is the same (e.g., three), three mushrooms have different shapes. Alternatively, the target object 80 to be a recognition target may be a lunch box or the like including a plurality of items therein. Each item included in a lunch box, e.g., a grilled fish often varies in outer shape in each lunch box. The object recognition system 10 according to the present example embodiment is a system which recognizes such a target object 80. When detecting the target object 80, the detection unit 11 outputs a notification (detection result) indicating the detection to the control unit 14.

The imaging unit 12 captures a moving image of the target object 80. The imaging unit 12 is achieved by an imaging device capable of taking a moving image, such as a Web camera, a digital still camera, or a camera built in a portable telephone terminal.

The object 13 is provided within a capturing range 90 of the imaging unit 12. In other words, a moving image taken by the imaging unit 12 includes a captured image of the object 13. The object 13 is an object being changeable in state within the capturing range 90, based on control of the control unit 14 described later. When the object 13 is, for example, a light source, the object 13 turns off or on. Herein, the capturing range 90 is determined by a distance from the imaging unit 12 to the target object 80, and by a focus distance of the imaging unit 12.

The control unit 14 receives a detection result from the detection unit 11. The control unit 14 controls a state of the object 13, based on the received detection result (output of the imaging unit 12). In this instance, the control unit 14 controls a state of the object 13 in such a way that a change in light quantity or hue between captured images due to a state change of the object 13 falls within a certain range. When the object 13 is, for example, a light source, the control unit 14 controls a state (on/off) of the light source, based on an output of the imaging unit 12, in such a way that a change in light quantity due to the light source falls within a certain range. Herein, a certain range is a range of a degree of a change amount that, when the imaging unit 12 has, for example, a function (automatic correction function) of automatically correcting exposure, the imaging unit 12 does not activate the automatic correction function.

The specifying unit 15 acquires a moving image taken by the imaging unit 12, from the imaging unit 12. Because the imaging unit 12 takes a moving image, the moving image includes a captured image including the object 13 before being changed in state, and a captured image including the object 13 after being changed in state. The specifying unit 15 detects a state change of the object 13 included in such a moving image. Then, among captured images included in a moving image, the specifying unit 15 specifies a captured image in which a state change of the object 13 is detected, as a captured image being a recognition target. The specifying unit 15 supplies the specified captured image to the recognition unit 16.

The recognition unit 16 receives the captured image from the specifying unit 15. The recognition unit 16 recognizes the target object 80 included in the captured image specified by the specifying unit 15. When the target object 80 is, for example, a mushroom, the recognition unit 16 recognizes a number of mushrooms. Alternatively, when the target object 80 is; for example, a lunch box, the recognition unit 16 recognizes each of a plurality of items. Note that a recognition scheme is not particularly limited, and any scheme may be used.

Figure 2:
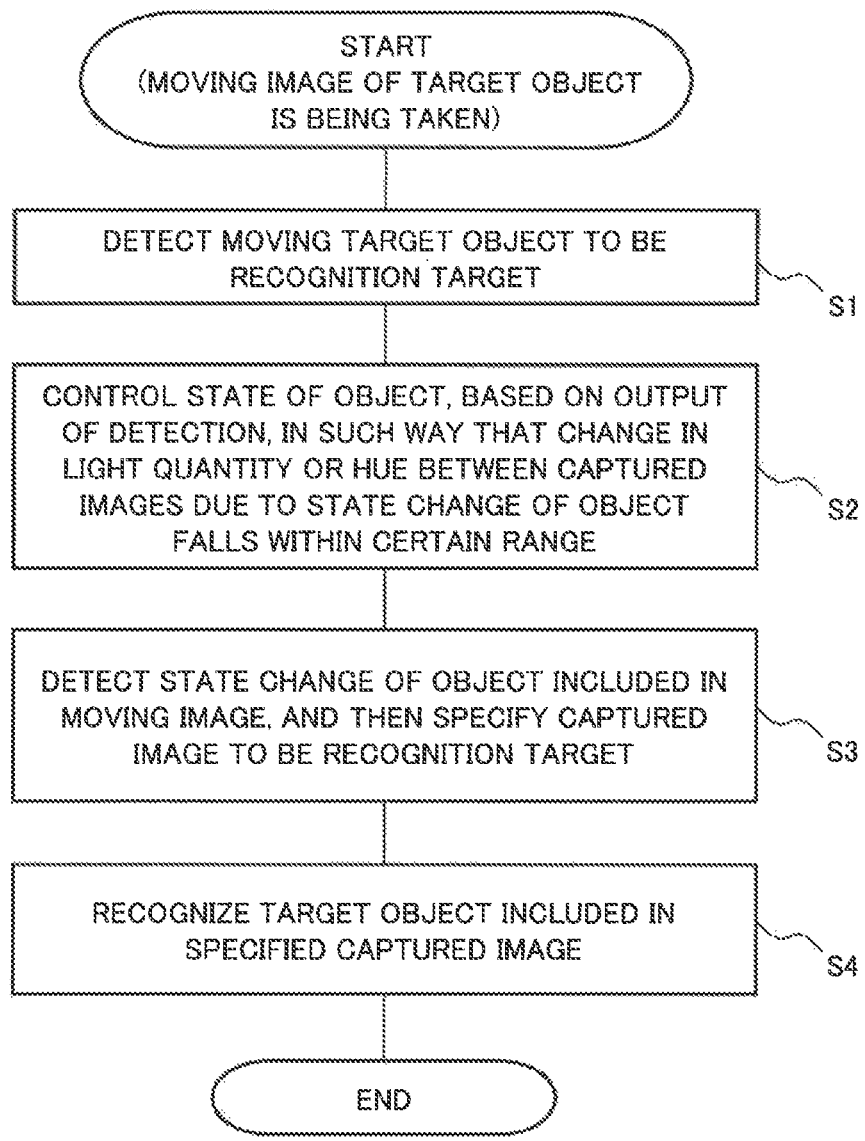
FIG. 2 is a flowchart illustrating one example of operational flow of the object recognition system according to the first example embodiment.

Next, operational flow of the object recognition system 10 according to the present example embodiment is described with reference to FIG. 2. FIG. 2 is a flowchart illustrating one example of an operation of the object recognition system 10 according to the present example embodiment. It is assumed that the imaging unit 12 takes a moving image of the target object 80 in the flowchart of FIG. 2.

As illustrated in FIG. 2, first, the detection unit 11 detects the moving target object 80 to be a recognition target (step S1). Then, based on an output of the detection, the control unit 14 controls a state of the object 13 in such a way that a change in light quantity or hue between captured images due to a state change of the object 13 falls within a certain range (step S2).

Thereafter, the specifying unit 15 detects a state change of the object 13 included in the moving image, and then specifies a captured image to be a recognition target (step S3). Then, the recognition unit 16 recognizes the target object 80 included in the specified captured image (step S4).

As described above, in the object recognition system 10 according to the present example embodiment, the specifying unit 15 detects a state change of the object 13 included in a moving image, and then specifies a captured image to be a recognition target. Based on an output of the detection, a state of the object 13 is controlled by the control unit 14 in such a way that a change in light quantity or hue between captured images due to a state change of the object 13 falls within a certain range. Thus, for example, because a change in light quantity or hue between captured images taken by the imaging unit 12 falls within a certain range, the imaging unit 12 can image a moving image keeping a balance of brightness or hue between captured images.

Furthermore, the control unit 14 controls the object 13, based on an output of detection of the target object 80. Therefore, a captured image from which the specifying unit 15 detects a state change of an object is a captured image related to an output of detection of the target object 80. Thus, the specifying unit 15 can specify, as a recognition target, a captured image in which, for example, the target object 80 is located at an optimum position. Because the recognition unit 16 performs recognition processing by use of a captured image specified in this way, the object recognition system 10 according to the present example embodiment can have high recognition precision.

Still further, because the recognition unit 16 performs recognition processing by use of a captured image specified by the specifying unit 15, a processing amount of recognition processing can be reduced as compared with a case where recognition processing is performed by use of all captured images. Therefore, according to the object recognition system 10 according to the present example embodiment, it is possible to suitably perform recognition processing without using a high-performance device, and therefore introduction cost can be reduced.

Yet further, the imaging unit 12 does not need to have a function of receiving an output from the detection unit 11, and needs only to have a function of taking a moving image. Thus, the object recognition system 10 according to the present example embodiment can employ a general imaging device such as a Web camera as the imaging unit 12, and introduction cost can be further reduced.

Second Example Embodiment

Figure 3:
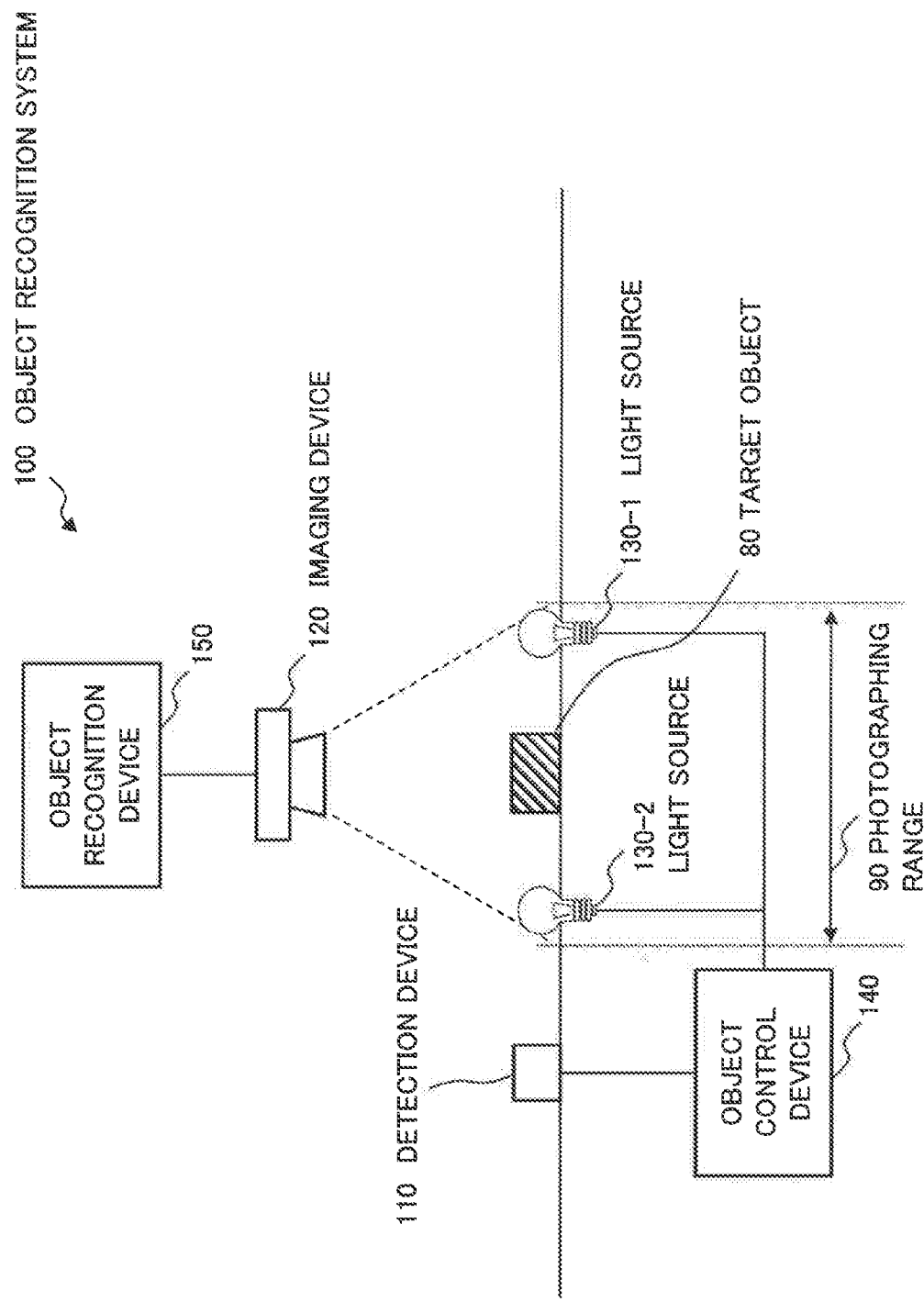
FIG. 3 is a diagram illustrating one example of a configuration of an object recognition system according to a second example embodiment.

Next, a second example embodiment of the present disclosure based on the above-described first example embodiment is described with reference to the drawings. First, one example of a configuration of an object recognition system 100 according to the present example embodiment is illustrated in FIG. 3. As illustrated in FIG. 3, the object recognition system 100 according to the present example embodiment includes a detection device 110, an imaging device 120, light sources (130-1 and 130-2), an object control device 140, and an object recognition device 150. Note that a description is given assuming that a number of light sources is two in the present example embodiment, but may be equal to or more than three. In the present example embodiment, the light sources (130-1 and 130-2) are referred to as a light source 130 when not it) distinguished from each other or when generically called. Note that, for convenience of description, the same reference signs are given to members having the same functions as members included in the drawings described in the above-described first example embodiment, and descriptions thereof are omitted.

The detection device 110 and the object control device 140 are communicably connected to each other. The object control device 140 and the light source 130 are also communicably connected to each other. The object recognition device 150 and the imaging device 120 are also communicably connected to each other. A connection form between the respective devices is not particularly limited, and the respective devices may be connected by employing communication systems different from each other or by employing the same communication system.

Figure 4:
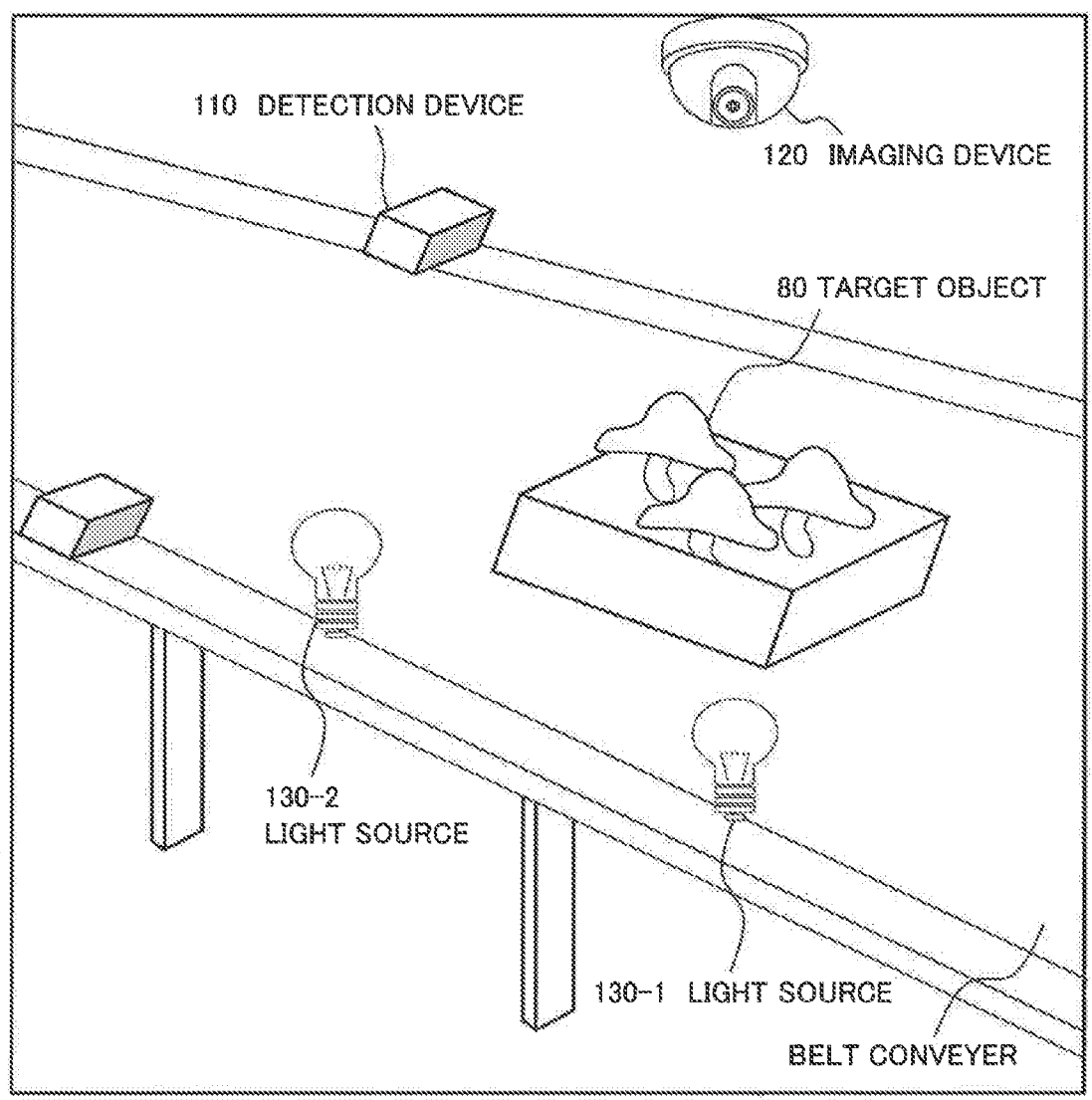
FIG. 4 is a view for illustrating a usage scene of the object recognition system according to the second example embodiment.

FIG. 4 is a view for illustrating a usage scene of the object recognition system 100 according to the present example embodiment. For example, when a target object 80 moves on a belt conveyer, the detection device 110 detects the target object 80 that moves in. The light source 130 is provided at a position where a captured image of the light source 130 is included in a moving image taken by the imaging device 120. When the detection device 110 detects the target object 80 moving on the belt conveyer, the object control device 140 controls a state of the light source 130. The imaging device 120 images a moving image used when the target object 80 is recognized. The moving image imaged by the imaging device 120 includes a captured image including the light source 130 before being changed in state, and a captured image including the light source 130 after being changed in state. The object recognition system 100 is a system utilized when the target object 80 is recognized by use of such a moving image.

Returning to FIG. 3, each device of the object recognition system 100 is described. The detection device 110 detects the target object 80 to be a recognition target. The detection device 110 includes a function of the detection unit 11 in the first example embodiment. The detection device 110 is achieved by, for example, a light emitting diode which emits an infrared ray, and an infrared sensor including a light receiving element which receives reflected light of the infrared ray. Note that the detection device 110 is not limited to an infrared sensor, and may be a sensor using an ultrasonic wave or a laser. The detection device 110 is provided at such a position as to be able to detect the target object 80 before the imaging device 120 takes an image of the target object 80 circulating on the belt conveyer, for example, as illustrated in FIG. 4. When detecting the target object 80 moving on the belt conveyer, the detection device 110 transmits (outputs) notification (also referred to as a detection result or a trigger signal) indicating the detection to the object control device 140. Note that, when the detection device 110 has a function of measuring a distance between the detection device 110 and the target object 80, the detection result may include distance information representing a distance between the detection device 110 and the target object 80. Moreover, timing at which the detection device 110 outputs a detection result may be timing immediately after detecting the target object 80 or after a predetermined time has elapsed. In the latter case, for example, a predetermined time may be a time taken for the target object 80 to move to a position (e.g., near a central part of a captured image) where recognition precision of the target object 80 becomes high in a captured image imaged by the imaging device 120 after the target object 80 is detected by the detection device 110.

The imaging device 120 captures a moving image of the target object 80. In the example illustrated in FIG. 4, the imaging device 120 captures images of a predetermined position on the belt conveyer. When the target object 80 moves on the belt conveyer, the imaging device 120 can take a moving image including the target object 80. The imaging device 120 has a function of the imaging unit 12 in the first example embodiment. The imaging device 120 is achieved by, for example, a Web camera or the like.

The light source 130 is provided within a capturing range 90 of the imaging device 120. Thus, a captured image of the light source 130 is included in a moving image taken by the imaging device 120. The light source 130 is equivalent to the object 13 in the first example embodiment. The light source 130 is an object being changeable in state within the capturing range 90, based on control of the object control device 140 described later. Specifically, the light source 130 turns off or on.

The object control device 140 has a function of the control unit 14 in the first example embodiment. Herein, a functional configuration of the object control device 140 is described with reference to FIG. 5. FIG. 5 is a functional block diagram illustrating one example of a functional configuration of the object control device 140 in the object recognition system 100 according to the present example embodiment.

As illustrated in FIG. 5, the object control device 140 includes a receiving unit 141 and a control unit 142. The receiving unit 141 receives a detection result transmitted by the detection device 110. The receiving unit 141 supplies the received detection result to the control unit 142.

The control unit 142 controls a state of the light source 130, based on the detection result supplied from the receiving unit 141. In this instance, the control unit 142 controls a state of the light source 130 in such a way that a change in light quantity between captured images due to a change of the light source 130 falls within a certain range.

Figure 8:
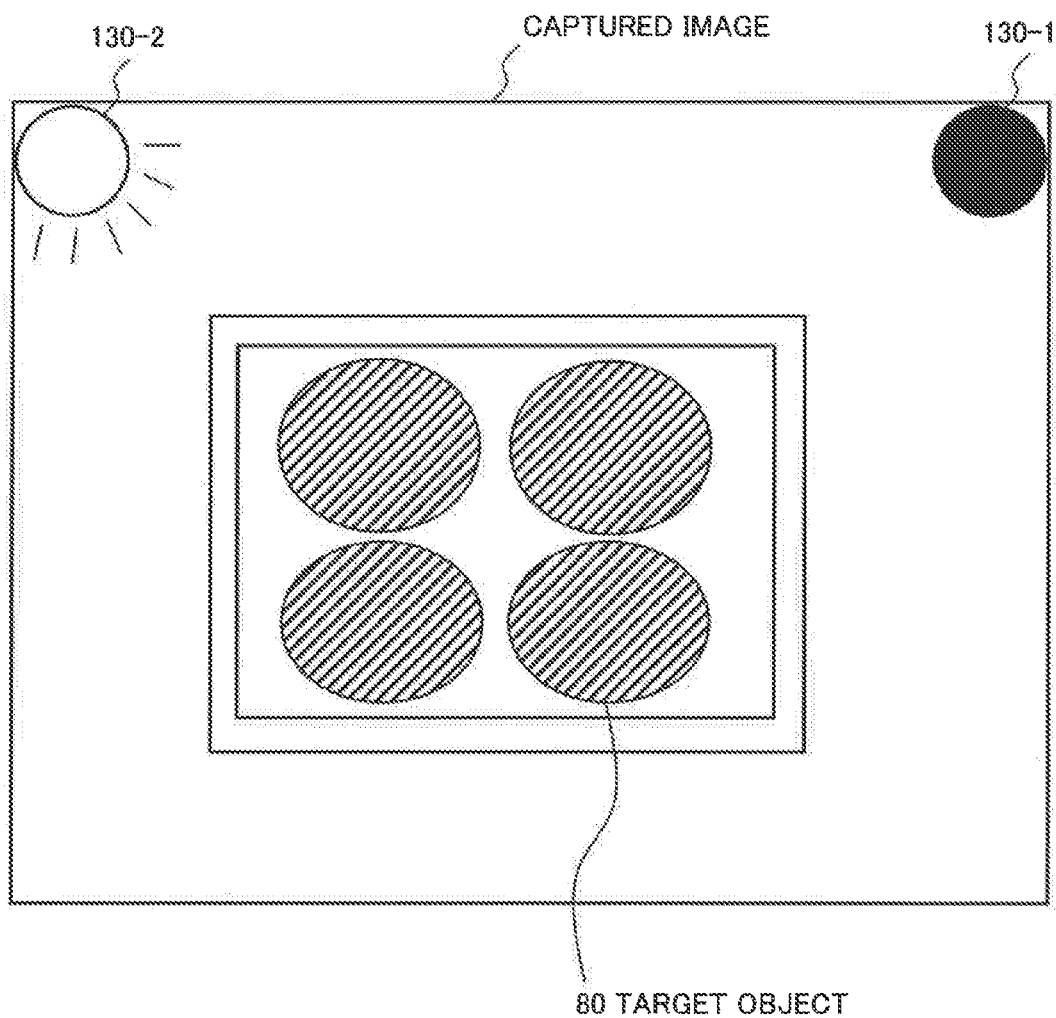
FIG. 8 is a view illustrating one example of a captured image.

Control by the control unit 142 is further described by using FIGS. 7 and 8. FIGS. 7 and 8 are views each illustrating one example of captured images taken by the imaging device 120. FIG. 7 illustrates one example of a captured image before the control unit 142 controls the light source 130. In FIG. 7, the light source 130-1 is turned on, and the light source 130-2 is turned off.

When the receiving unit 141 receives a detection result, the control unit 142 controls the light source 130-1 and the light source 130-2. When the detection device 110 transmits a detection result immediately after detecting the target object 80, the control unit 142 controls the light source 130 depending on a movement speed of the target object 80 after a predetermined time from a time at which the detection result is received. Specifically, it is preferable that the control unit 142 controls the light source 130 at timing at which the target object 80 moves to a position (e.g., near a central part of a captured image) where recognition precision of the target object 80 becomes high in a captured image imaged by the imaging device 120. Alternatively, when the detection device 110 detects the target object 80 and transmits a detection result after a predetermined time has elapsed, it is preferable that the control unit 142 controls the light source 130 with reception of the detection result as a trigger.

FIG. 8 illustrates one example of a captured image after the control unit 142 controls the light source 130. In FIG. 8, the light source 130-2 is turned on, and the light source 130-1 is turned off. As illustrated in FIGS. 7 and 8, it can be seen that, before and after the control unit 142 controls the light source 130-1 and the light source 130-2, the light source 130 that is turned on is one of the light source 130-1 and the light source 130-2. In other words, each of the light quantities before and after control by the control unit 142 is a light quantity from one light source 130, and there is substantially no change. Thus, the control unit 142 controls on/off of the light source 130 in such a way that a change in light quantity between captured images due to on/off of the light source 130 falls within a certain range.

Accordingly, a change in light quantities before and after control by the control unit 142 is within a certain range. Thus, for example, even with the imaging device 120 which automatically corrects exposure, it is possible to keep the imaging device 120 from making an excessive correction. Therefore, a captured image imaged by the imaging device 120 is an image keeping a balance of brightness, and thus, the object recognition device 150 to be described later can perform recognition processing by use of such a captured image.

Returning to FIG. 3, the object recognition device 150 of the object recognition system 100 is described. The object recognition device 150 has functions of the specifying unit 15 and the recognition unit 16 in the first example embodiment. The object recognition device 150 acquires a moving image imaged by the imaging device 120, from the imaging device 120. Herein, a functional configuration of the object recognition device 150 is described with reference to FIG. 6. FIG. 6 is a functional block diagram illustrating one example of a functional configuration of the object recognition device 150 in the object recognition system 100 according to the present example embodiment.

As illustrated in FIG. 6, the object recognition device 150 includes a specifying unit 151 and a recognition unit 152. The object recognition device 150 may further include a storage unit 153. Note that the storage unit 153 may be achieved by a device separate from the object recognition device 150.

The specifying unit 151 is equivalent to the specifying unit 15 in the first example embodiment. The specifying unit 151 detects a state change of the light source 130 included in a moving image acquired from the imaging device 120. Then, among captured images included in the moving image, the specifying unit 151 specifies a captured image in which a state change of the light source 130 is detected, as a captured image being a recognition target.

In the example in FIGS. 7 and 8, the light source 130-1 changes from an on-state to an off-state, and the light source 130-2 changes from an off-state to an on-state. The specifying unit 151 detects this state change, and specifies a detected captured image (in the case of this example, the captured image in FIG. 8) as a captured image being a recognition target. Then, the specifying unit 151 supplies the specified captured image to the recognition unit 152.

The storage unit 153 stores data for recognition used by the recognition unit 152 to recognize the target object 80 in the captured image. The storage unit 153 may be provided inside the recognition unit 152, or may be achieved by a storage device separate from the object recognition device 150.

The recognition unit 152 is equivalent to the recognition unit 16 in the first example embodiment. The recognition unit 152 receives the specified captured image from the specifying unit 151. The recognition unit 152 recognizes the target object 80 included in the received captured image by referring to the storage unit 153.

Figure 9:
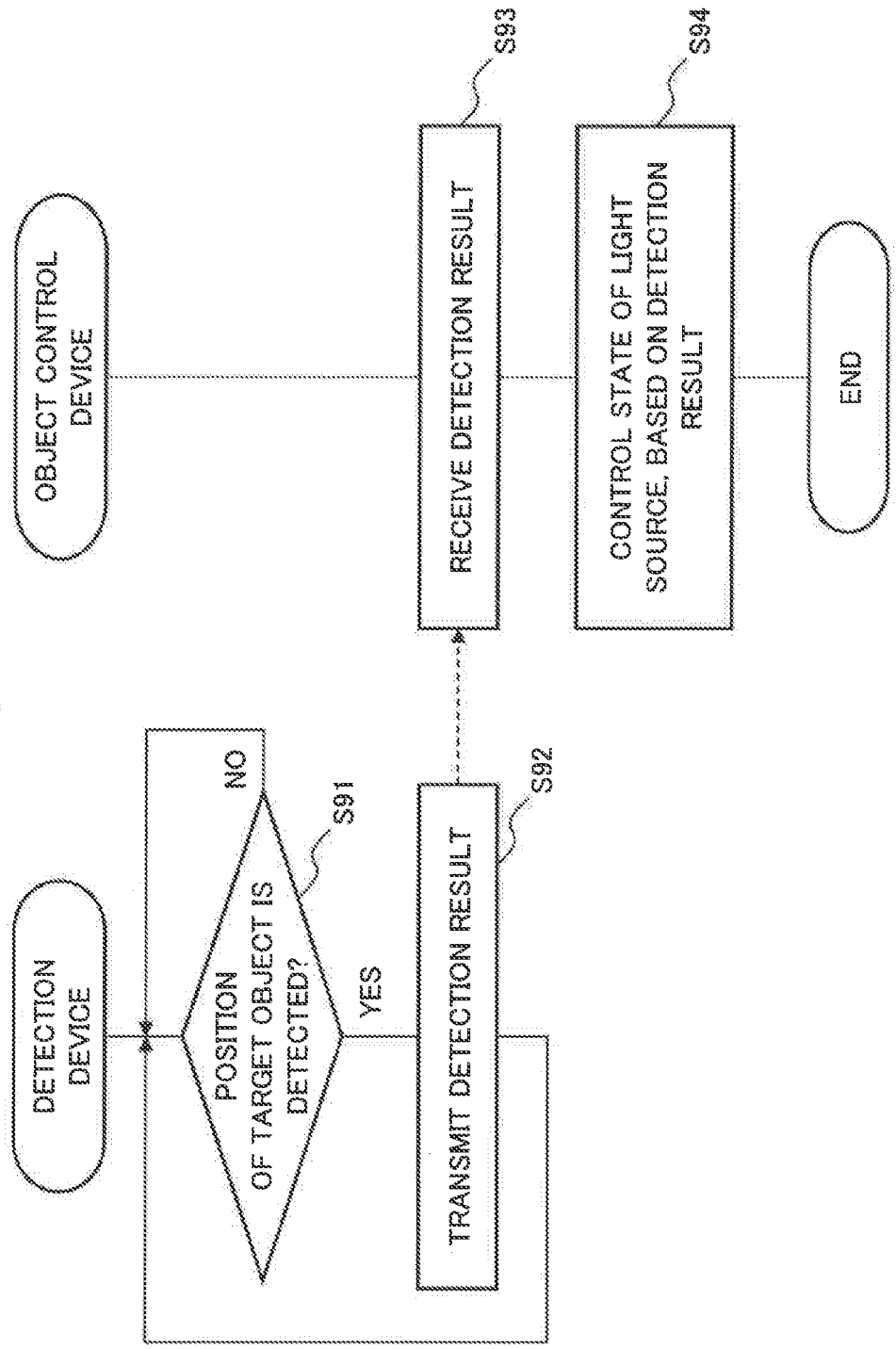
FIG. 9 is a flowchart illustrating one example of operations of a detection device and the object control device in the object recognition system according to the second example embodiment.

Next, operations of the detection device 110 and the object control device 140 in the object recognition system 100 according to the present example embodiment are described with reference to FIG. 9. FIG. 9 is a flowchart illustrating one example of operations of the detection device 110 and the object control device 140 in the object recognition system 100 according to the present example embodiment. In the flowchart of FIG. 9, an operation of the detection device 110 is illustrated on a left side, an operation of the object control device 140 is illustrated on a right side, and a broken-line arrow between the respective operations represents flow of information. Note that the imaging device 120 is assumed to take a moving image of the target object 80 in the flowchart of FIG. 9.

The detection device 110 repeats a step S91 until detecting the moving target object 80 to be a recognition target. When detecting the target object 80 (YES in the step S91), the detection device 110 transmits a detection result to the object control device 140 (step S92).

The receiving unit 141 of the object control device 140 receives the detection result transmitted from the detection device 110 (step S93). Then, the control unit 142 controls a state of the light source 130, based on the detection result (step S94).

The object control device 140 repeats the step S93 and step S94 each time the detection result is received from the detection device 110.

Figure 10:
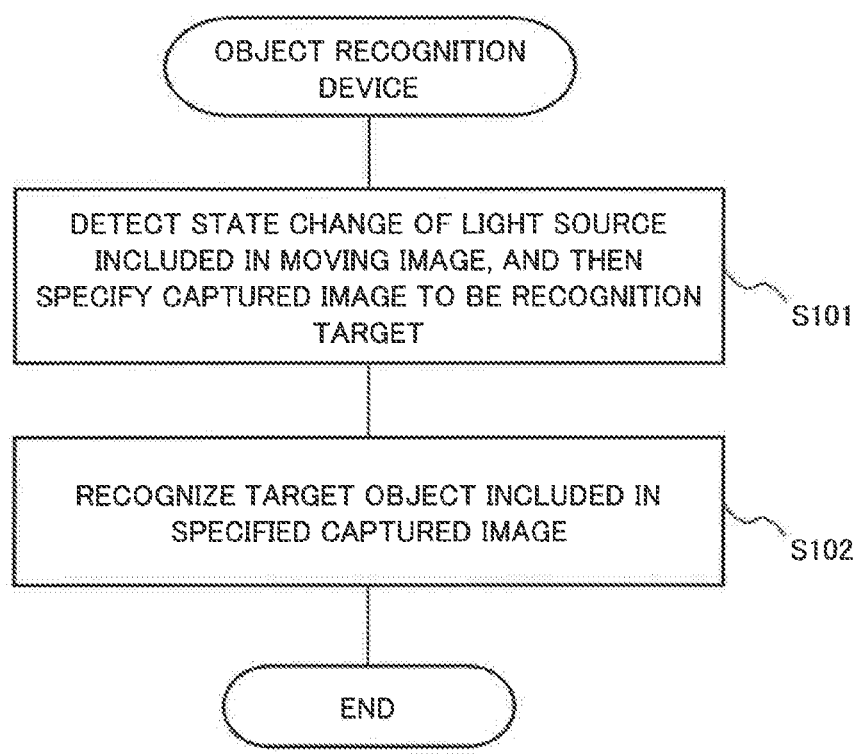
FIG. 10 is a flowchart illustrating one example of an operation of the object recognition device in the object recognition system according to the second example embodiment.

Next, an operation of the object recognition device 150 in the object recognition system 100 according to the present example embodiment is described with reference to FIG. 10. FIG. 10 is a flowchart illustrating one example of an operation of the object recognition device 150 in the object recognition system 100 according to the present example embodiment. In the flowchart of FIG. 10, a description is given assuming that the object recognition device 150 acquires a moving image taken by the imaging device 120.

As illustrated in FIG. 10, the specifying unit 151 detects a state change of the light source 130 included in the moving image, and specifies a captured image in which a state change of the light source 130 is detected, as a captured image being a recognition target (step S101).

Then, the recognition unit 152 recognizes the target object 80 included in the specified captured image (step S102).

The recognition unit 152 performs the step S102 each time the specifying unit 151 specifies a captured image to be a recognition target.

As described above, in the object recognition system 100 according to the present example embodiment, the detection device 110 detects the moving target object 80 to be a recognition target, and the imaging device 120 images a moving image of the target object 80. Then, based on an output of the detection device 110, the object control device 140 controls on/off of the light source 130 in such a way that a change in light quantity or hue between captured images due to a change of the light source 130 being changeable in state within the capturing range 90 of the imaging device 120 falls within a certain range. Thereafter, the object recognition device 150 detects a state change of the light source 130 included in the moving image, then specifies a captured image to be a recognition target, and recognizes the target object 80 included in the specified captured image.

Therefore, the object recognition system 100 according to the present example embodiment has an advantageous effect similar to that of the object recognition system 10 according to the first example embodiment described above. Moreover, the object recognition system 100 includes the light source 130 as an object controlled by the object control device 140. Consequently, the object recognition system 100 can specify an optimum captured image having higher recognition precision, with a simple configuration, and at low introduction cost.

Note that the light source 130 is preferably disposed in such a way as to be included at a recognition start position of a captured image on the captured image. Generally, recognition of a captured image is started from upper left of the captured image. Therefore, the light source 130 is preferably disposed in such a way as to be included on upper left of a captured image. Thus, the specifying unit 151 can specify a captured image to be a recognition target, by checking a recognition start position. Therefore, the specifying unit 151 can reduce a processing amount for specification of a captured image, as compared with a case where the light source 130 is disposed at a place other than a recognition start position.

In addition, the object control device 140 may control the light source 130 twice or once after receiving a detection result and before receiving a next detection result. This is described with reference to FIGS. 11 and 12.

Figure 11:
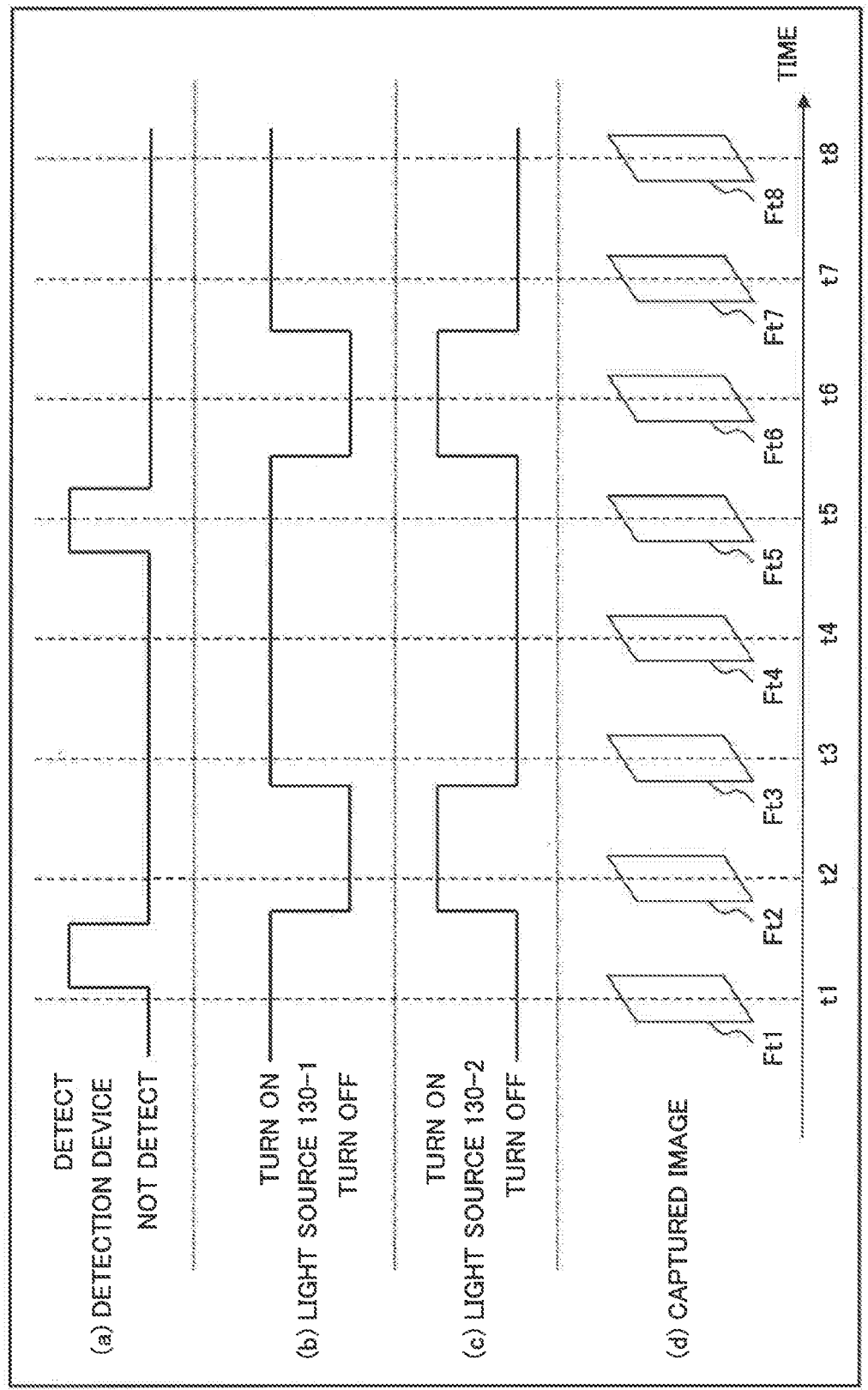
FIG. 11 is a diagram for illustrating of control by the object control device.
Figure 12:
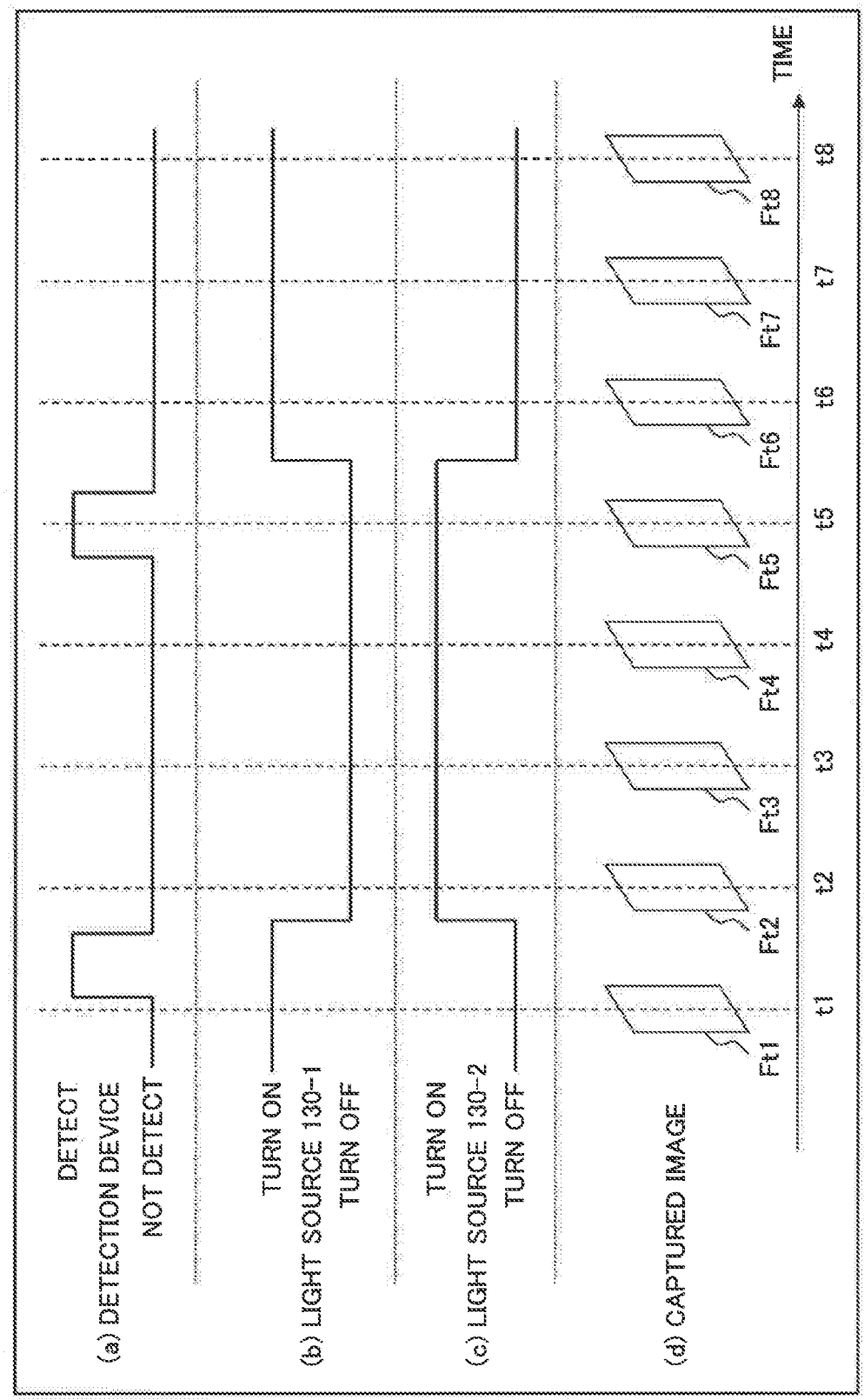
FIG. 12 is a diagram for illustrating timing of control by the object control device.

FIGS. 11 and 12 are diagrams for illustrating timing of control by the object control device 140. In each of FIGS. 11 and 12, a horizontal axis represents time. Moreover, detection status of the target object 80 by a detection device is represented in a part of (a). Further, status of on/off of the light source 130-1 is represented in a part of (b), and status of on/off of the light source 130-2 is represented in a part of (c). Still further, captured images Ft1 to Ft8 taken at respective times t1 to t8 are represented in a part of (d).

In FIG. 11, it is assumed that an initial state is a state in which the light source 130-1 is turned on, and the light source 130-2 is turned off. Then, after the target object 80 is detected, the control unit 142 of the object control device 140 turns off the light source 130-1, and turns on the light source 130-2. Then, after a predetermined time, the control unit 142 controls on/off of the light source 130 in such a way as to set the initial state (a state in which the light source 130-1 is turned on, and the light source 130-2 is turned off). The predetermined time needs only to be a time in which at least one captured image is acquired while the light source 130-1 is turned off and the light source 130-2 is turned on.

Thus, the specifying unit 151 can specify captured images (Ft2 and Ft6 in the case of FIG. 11) being recognition targets, by detecting a change from the initial state.

In FIG. 12 as well, it is assumed that an initial state is a state in which the light source 130-1 is turned on, and the light source 130-2 is turned off. After the target object 80 is detected, the control unit 142 of the object control device 140 turns off the light source 130-1, and turns on the light source 130-2. Then, the control unit 142 does not change the state of the light source 130 until the target object 80 is detected next. When the target object 80 is detected next, the control unit 142 controls the light source 130 in such a way as to be set in a state immediately before a current state (in this case, the initial state). In other words, the control unit 142 turns on the light source 130-1, and turns off the light source 130-2.

Thus, the specifying unit 151 can specify captured images (Ft2 and Ft6 in the case of FIG. 12) being recognition targets, by detecting a state change of the light source 130 between captured images.

Figure 13:
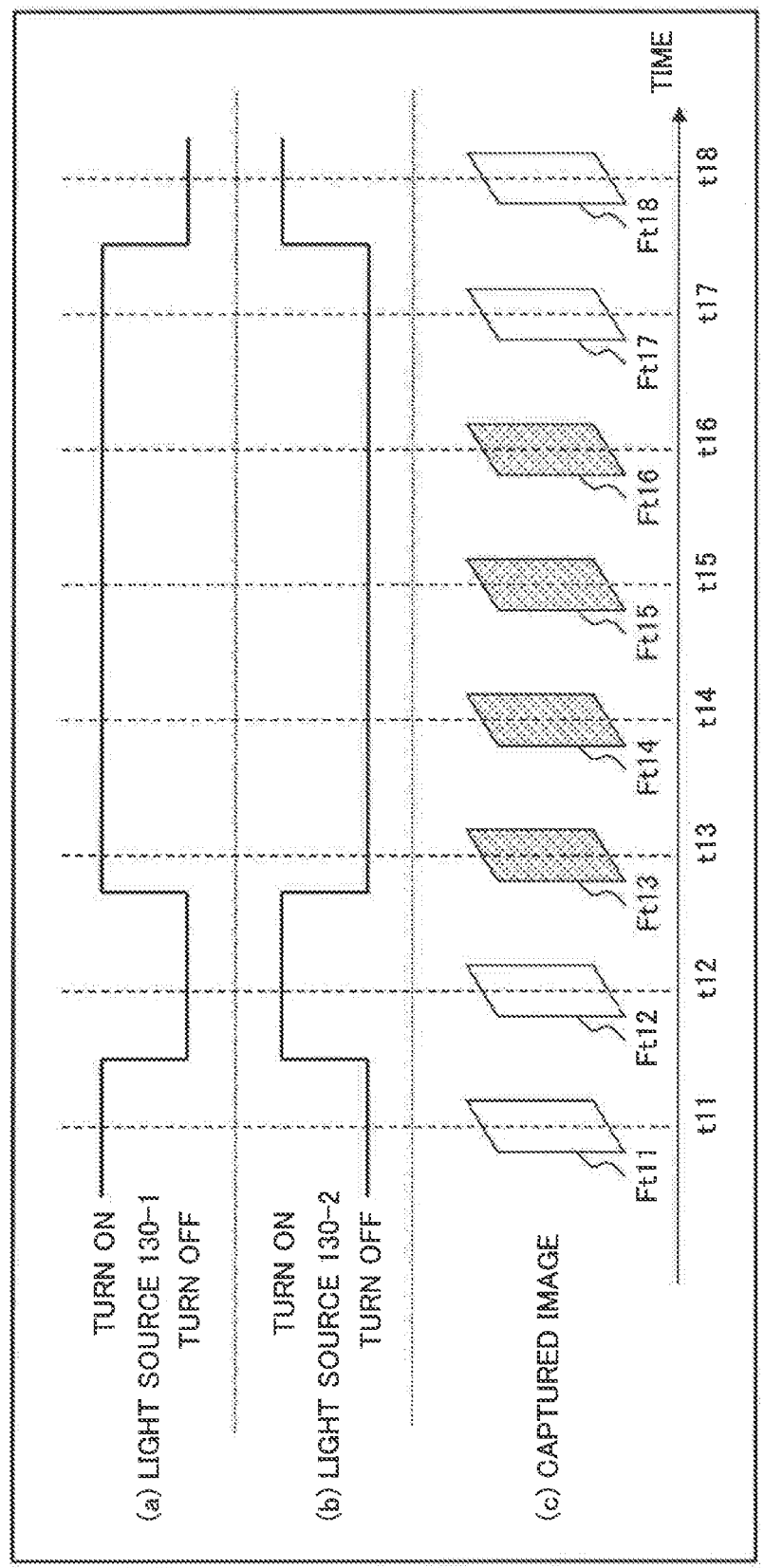
FIG. 13 is a diagram for illustrating a captured image for which a specifying unit skips detection of a state change of a light source.

In addition, after specifying a captured image being a recognition target, with the control unit 142, the specifying unit 151 may skip detection of a state change of an object for a predetermined number of captured images from the specified captured image. This is described with reference to FIG. 13. FIG. 13 is a diagram for illustrating a captured image for which the specifying unit 151 skips detection of a state change of an object. In FIG. 13, a case where the specifying unit 151 skips detection of a state change of an object when the control unit 142 performs the control as illustrated in FIG. 11 is described. However, it is also applicable even when the control unit 142 performs the control as illustrated in FIG. 12.

In FIG. 13, a horizontal axis represents time. Further, status of on/off of the light source 130-1 is represented in a part of (a), and status of on/off of the light source 130-2 is represented in a part of (b). Still further, captured images Ft11 to Ft18 taken at respective times t11 to t18 are represented in a part of (c).

There is a change in the state of the light source 130 between the captured image Ft11 and the captured image Ft12. Therefore, the specifying unit 151 specifies, as a captured image being a recognition target, the captured image Ft12 taken when the light source 130-1 is in an off-state and the light source 130-2 is in an on-state. When the target object 80 circulates on a belt conveyer as illustrated in FIG. 4, the specifying unit 151 specifies a captured image in which a state change of the light source 130 is detected, as a captured image being a recognition target. In addition, there is no change in the state of the light source 130 in a captured image before a state of the light source 130 changes next. Therefore, when the specifying unit 151 does not skip detection of a state change of an object, the specifying unit 151 detects that there is no state change of the light source 130, and determines an image having no state change of light source 130 as a captured image that is not a recognition target.

In this way, when the target object 80 circulates on the belt conveyer as illustrated in FIG. 4, a predetermined number of captured images after a captured image specified as a recognition target by the specifying unit 151 are captured images that are not recognition targets. Therefore, the specifying unit 151 may skip detection processing of a state change of an object for a predetermined number of captured images from a specified captured image, for example, for the captured images Ft13 to Ft16 taken during t12<t<t17. Consequently, it is possible to reduce a processing amount of detection processing performed by the specifying unit 151.

(Modification Example)

Although the object 13 in the first example embodiment is a light source in the example described in the second example embodiment, the object 13 is not limited to a light source. The present modification example describes that, for example, a mechanism (referred to as a switch mechanism 131) being capable of displaying red or blue in the capturing range 90 is applied instead of the light source 130 in the second example embodiment. Note that the switch mechanism 131 needs only to be formed in such a way that a red or blue color is included in a taken captured image, and the switch mechanism 131 is not particularly limited in shape.

Figure 14:
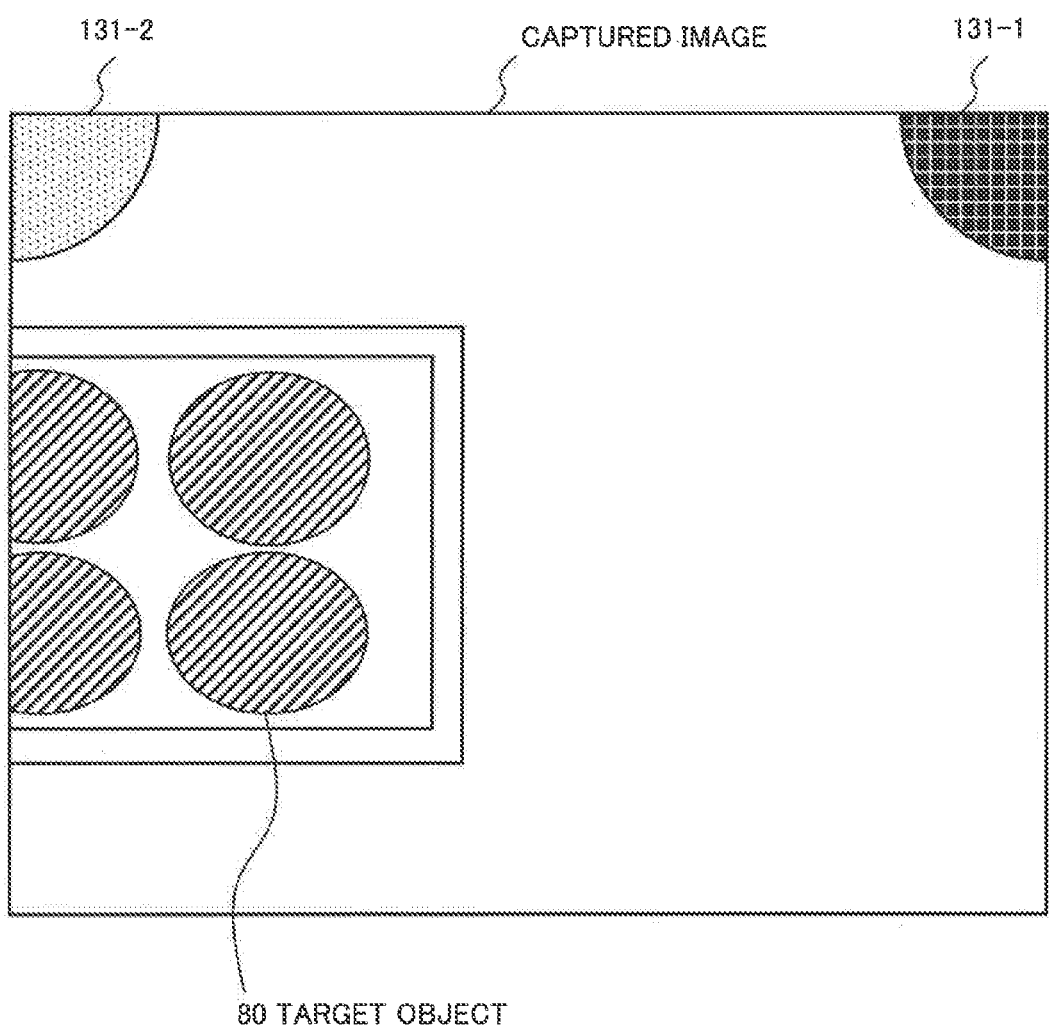
FIG. 14 is a view illustrating one example of a captured image.
Figure 15:
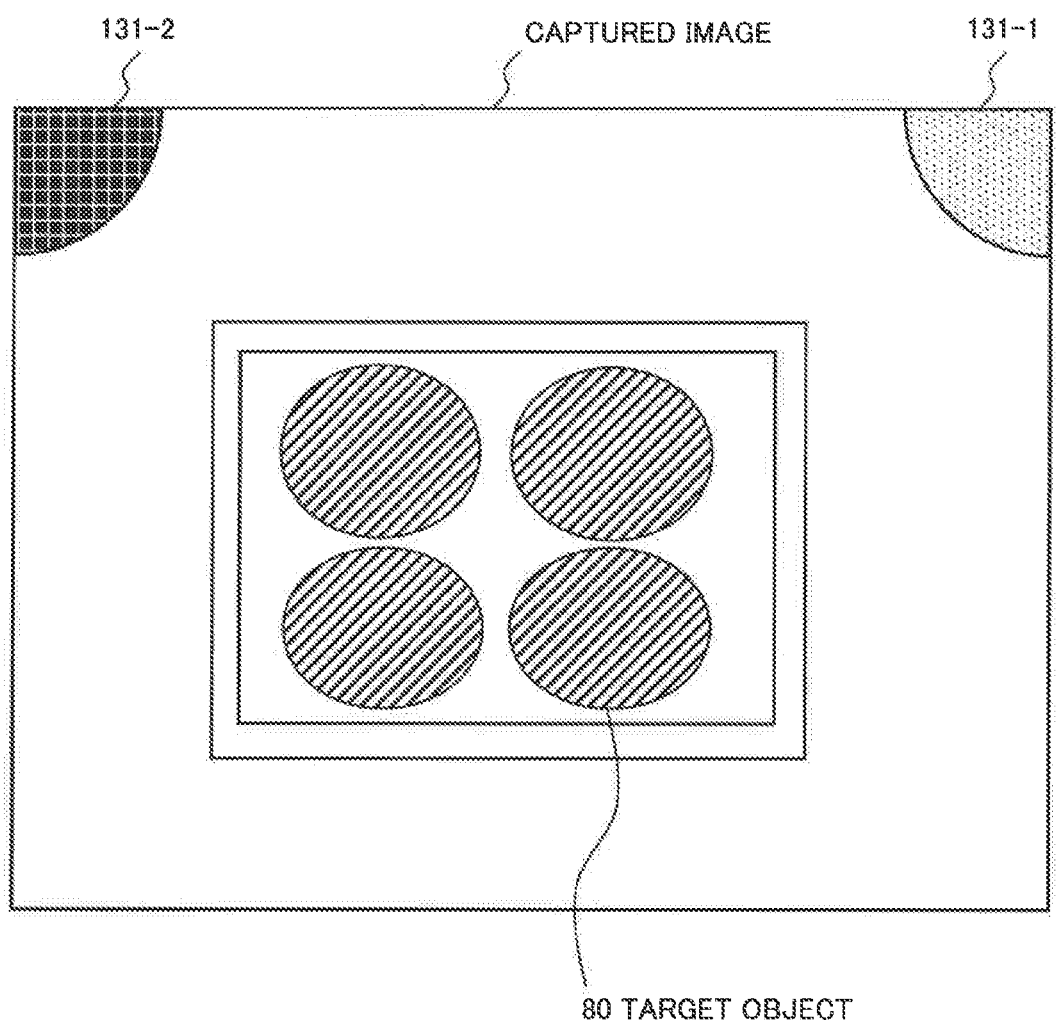
FIG. 15 is a view illustrating one example of a captured image.

FIGS. 14 and 15 are views each illustrating one example of captured images taken by the imaging device 120. FIG. 14 illustrates one example of a captured image before the control unit 142 controls the switch mechanism 131. It is assumed that, in FIG. 14, a switch mechanism 131-1 included in upper right of the captured image displays a red color, and a switch mechanism 131-2 included in upper left of the captured image displays a blue color.

FIG. 15 illustrates one example of a captured image before the control unit 142 controls the switch mechanism 131. It is assumed that, in FIG. 15, the switch mechanism 131-2 displays a red color, and the switch mechanism 131-1 displays a blue color. As illustrated in FIGS. 14 and 15, before and after the control unit 142 controls the switch mechanism 131-1 and the switch mechanism 131-2, one of the switch mechanisms 131 displays a red color, and another of the switch mechanisms 131 displays a blue color. In other words, there is substantially no change in hue before and after control by the control unit 142. In this way, the control unit 142 may control each of the switch mechanisms 131 in such a way that a change in hue between captured images due to a state change of the switch mechanism 131 falls within a certain range.

Thus, even when an object controlled by the control unit 142 is an object other than a light source, a change in hue in captured images before and after control by the control unit 142 is within a certain range. Therefore, for example, even with the imaging device 120 which automatically corrects exposure, it is possible to keep the imaging device 120 from making an excessive correction. Consequently, as in the second example embodiment described above, the object recognition device 150 can perform recognition processing by use of a captured image having a little change in hue, and therefore, recognition precision can be raised.

Third Example Embodiment

A third example embodiment is described. Although use of two light sources (130-1 and 130-2) or two switch mechanisms (131-1 and 131-2) has been described in the above-described second example embodiment, three or more light sources or switch mechanisms may be used. In the present example embodiment, the object recognition system 100 when three or more light sources 130 are used is described. Note that a configuration of the object recognition system 100 according to the present example embodiment is similar to that in FIG. 3. Note that, in the present example embodiment, a detection result output by the detection device 110 is assumed to include distance information representing a distance between the detection device 110 and the target object 80.

FIGS. 16 to 18 are views each illustrating one example of captured images taken by the imaging device 120. FIG. 16 illustrates one example of a captured image when the target object 80 is not detected by the detection device 110. The object recognition system 100 according to the present example embodiment includes four light sources (130-1 to 130-4). As illustrated in FIG. 16, the light source 130-1 is provided in such a way as to be included on upper right of a captured image, and the light source 130-2 is provided in such a way as to be included on upper left of the captured image. Moreover, the light source 130-3 is provided in such a way as to be included on lower left of the captured image, and the light source 130-4 is provided in such a way as to be included on lower right of the captured image. As illustrated in FIG. 16, it is assumed that the light source 130-1 and the light source 130-3 are in an on-state, and the light source 130-2 and the light source 130-4 are in an off-state. It is also assumed that a position represented by a broken line substantially equally dividing the captured image illustrated in FIG. 16 into upper and lower halves is a reference position.

From the distance information included in the detection result received by the receiving unit 141 from the detection device 110, the control unit 142 checks whether a substantial center of the target object 80 is located on an upper side or a lower side of the captured image from the reference position. Then, the control unit 142 controls the light sources (130-1 to 130-4), based on a control pattern stored in an unillustrated storage unit. The control pattern represents a combination of state changes of the light sources 130-1 to 130-4, and expresses the target object 80 in the captured image. For example, when the substantial center of the target object 80 is located on the lower side of the captured image from the reference position, information representing that the light source 130-2 and the light source 130-4 are turned on, and the light source 130-1 and the light source 130-3 are turned off is stored in the storage unit as a control pattern. Moreover, for example, when the substantial center of the target object 80 is located on the upper side of the captured image from the reference position, information representing that the light source 130-1 and the light source 130-2 are turned on, and the light source 130-3 and the light source 130-4 are turned off is stored in the storage unit as a control pattern.

Furthermore, in the storage unit 153 of the object recognition device 150, a turn-on pattern corresponding to a control pattern is stored in association with information representing the target object 80 in an image. In the storage unit 153, for example, a turn-on pattern indicating that the light source 130-2 and the light source 130-4 are turned on, and the light source 130-1 and the light source 130-3 are turned off is stored in association with information representing that the target object 80 is located on the lower side of the captured image from the reference position. Moreover, in the storage unit 153, for example, a turn-on pattern indicating that the light source 130-1 and the light source 130-2 are turned on, and the light source 130-3 and the light source 130-4 are turned off is stored in association with information representing that the target object 80 is located on the upper side of the captured image from the reference position.

The control unit 142 specifies a control pattern, based on the distance information, and controls a state of the light source 130 in accordance with the specified control pattern.

FIG. 17 illustrates one example of a captured image after the control unit 142 controls the light source 130. In the example in FIG. 17, the substantial center of the target object 80 is located on the lower side from the reference position. Therefore, the control unit 142 turns on the light source 130-2 and the light source 130-4, and turns off the light source 130-1 and the light source 130-3.

Then, the specifying unit 151 detects a state change of an object from a moving image, and then specifies a captured image to be a recognition target. Specifically, by checking a change in a recognition start position of a captured image, the specifying unit 151 checks whether or not the captured image is a captured image to be a recognition target. Thereby, the specifying unit 151 specifies a captured image being a recognition target. A captured image illustrated in FIG. 17 has a change in the light source 130-2 from the captured image illustrated in FIG. 16, and is therefore specified as a captured image being a recognition target.

FIG. 18 illustrates one example of a captured image after the control unit 142 controls the light source 130. In the example in FIG. 18, the substantial center of the target object 80 is located on the upper side from the reference position. Therefore, the control unit 142 turns on the light source 130-1 and the light source 130-2, and turns off the light source 130-3 and the light source 130-4. A captured image illustrated in FIG. 18 has a change in the light source 130-2 from the captured image illustrated in FIG. 16, and is therefore specified as a captured image being a recognition target.

Then, the recognition unit 152 checks a combination of state changes of objects. Specifically, the recognition unit 152 specifies a turn-on pattern with reference to the storage unit 153. Then, information being associated with the specified turn-on pattern and representing a position of the target object 80 in the captured image is acquired. In the recognition unit 152, the target object 80 is located on the lower side from the reference position in the case of the example illustrated in FIG. 17, and the target object 80 is located on the upper side from the reference position in the case of the example illustrated in FIG. 18.

When acquiring information being associated with a turn-on pattern specified in this way and representing a position of the target object 80 in the captured image, the recognition unit 152 performs recognition processing, based on the acquired information representing the position. Thereby, when recognizing the target object 80, the recognition unit 152 can reduce a processing amount concerning correction processing or the like of the position of the target object 80.

(Regarding Hardware Configuration)

In each example embodiment of the present disclosure, each component of each device indicates a block of a functional unit. Some or all of components of each device are each achieved by, for example, any combination of an information processing device 900 and a program as illustrated in FIG. 19. FIG. 19 is a block diagram illustrating one example of a hardware configuration of the information processing device 900 which achieves each component of each device. The information processing device 900 includes a following configuration as one example.

A central processing unit (CPU) 901
A read only memory (ROM) 902
A random access memory (RAM) 903
A program 904 loaded onto the RAM 903
A storage device 905 storing the program 904
A drive device 907 which reads and writes in a recording medium 906
A communication interface 908 connected to a communication network 909
An input/output interface 910 which inputs and outputs data
A bus 911 connecting each component Each component of each device in each example embodiment is achieved when the CPU 901 acquires and executes the program 904 which achieves a function of each component. The program 904 which achieves a function of each component of each device is, for example, previously stored in the storage device 905 or the ROM 902, and read by the CPU 901 as needed. Note that the program 904 may be supplied to the CPU 901 via the communication network 909, or may be previously stored in the recording medium 906, and read and then supplied to the CPU 901 by the drive device 907.

A method of achieving each device includes various modification examples. For example, each device may be achieved by any combination of the information processing device 900 and a program respectively separate for each component. Alternatively, a plurality of components included in each device may be achieved by any combination of one information processing device 900 and one program.

Furthermore, some or all of components of each device are each achieved by any other general-purpose or dedicated circuit, processor, or the like, or a combination thereof. These components may be each configured by a single chip, or configured by a plurality of chips connected via a bus.

Some or all of components of each device may be each achieved by a combination of the above-described circuit or the like and a program.

When some or all of components of each device are each achieved by a plurality of information processing devices, circuits, or the like, the plurality of information processing devices, circuits, or the like may be arranged in a centralized or distributed way. For example, information processing devices, circuits, or the like may be achieved as a form in which each of information processing devices, circuits, or the like is connected via a communication network, such as a client and server system or a cloud computing system.

Note that each example embodiment described above is a preferred example embodiment of the present disclosure, and the scope of the present disclosure is not limited to only each example embodiment described above. A person skilled in the art may make a modification or a substitution in each example embodiment described above without departing from the spirit of the present disclosure, and construct a form in which various alterations are made.

The whole or part of the example embodiments disclosed above can be described as, but not limited to, the following supplementary notes.

(Supplementary Note 1)

An object recognition system comprising:

detection means for detecting a moving target object to be a recognition target;

imaging means for capturing a moving image of the target object;

an object being changeable in state within a capturing range of the imaging means;

control means for controlling a state of the object, based on an output of the detection means, in such a way that a change in light quantity, or hue between captured images due to a state change of the object fails within a certain range;

specifying means for detecting a state change of the object being included in the moving image, and then specifying a captured image to be a recognition target; and recognition means for recognizing the target object included in the specified captured image.

(Supplementary Note 2)

The object recognition system according to supplementary note 1, wherein the object includes two or more light sources, and the control means controls on/off of the two or more light sources in such a way that a change in light quantity between captured images due to an on/off change of the two or more light sources falls within a certain range.

(Supplementary Note 3)

The object recognition system according to supplementary note 1 or 2, wherein the object is disposed in such a way as to be at a recognition start position of the captured image, and the specifying means detects a state change of the object at the recognition start position.

(Supplementary Note 4)

The object recognition system according to any one of supplementary notes 1 to 3, wherein, when specifying the captured image, the specifying means skips detection of a state change of the object for a predetermined number of captured images from the specified captured image.

(Supplementary Note 5)

The object recognition system according to any one of supplementary notes 1 to 4, wherein a number of the objects is three or more, and the control means controls a state of each of the three or more objects in such a way as to express a position of the target object in a captured image by a combination of state changes of the three or more objects, (Supplementary Note 6)

An object control device comprising:

receiving means for receiving a detection result of a moving target object to be a recognition target; and control means for controlling an object being changeable in state within a capturing range of the target object, based on the detection result, the control means controlling a state of the object in such a way that a change in light quantity or hue between captured images due to a state change of the object falls within a certain range.

(Supplementary Note 7)

The object control device according to supplementary note 6, wherein the object includes two or more light sources, and the control means controls on/off of the two or more light sources in such a way that a change in light quantity between captured images due to an on/off change of the two or more light sources falls within a certain range.

(Supplementary Note 8)

An object recognition device comprising:

specifying means for detecting, from a moving image of a moving target object that is an imaged target object to be a recognition target, a state change of an object controlled by an object control device, and then specifying a captured image to be a recognition target, the object control device controlling an object being changeable in state within a capturing range of the moving image, in such a way that a change in light quantity or hue between captured images due to a state change of the object falls within a certain range, the object control device controlling a state of the object, based on a detection result of the target object; and recognition means for recognizing the target object included in the specified captured image.

(Supplementary Note 9)

The object recognition device according to supplementary note 8, wherein the object includes two or more light sources, and the specifying means detects on/off of the two or more light sources controlled in such a way that a change in light quantity between captured images due to an on/off change of the two or more light sources falls within a certain range, and then specifies the captured image.

(Supplementary Note 10)

An object recognition method in an object recognition system including a detection device, an imaging device, an object being changeable in state within a capturing range of the imaging device, an object recognition device, and an object control device, the method comprising:

by the detection device, detecting a moving target object to be a recognition target;

by the imaging device, capturing a moving image of the target object;

by the object control device, controlling a state of the object, based on an output of the detection, in such a way that a change in light quantity or hue between captured images due to a state change of the object falls within a certain range;

by the object recognition device, detecting a state change of the object being included in the moving image, and then specifying a captured image to be a recognition target; and recognizing the target object included in the specified captured image.

(Supplementary Note 11)

The object recognition method according to supplementary note 10, wherein the object includes two or more light sources, and the object control device controls on/off of the two or more light sources in such a way that a change in light quantity between captured images due to an on/off change of the two or more light sources falls within a certain range.

(Supplementary Note 12)

An object control method comprising:

receiving a detection result of a moving target object to be a recognition target; and controlling an object being changeable in state within a capturing range of the target object, based on the detection result, in such a way that a change in light quantity or hue between captured images due to a state change of the object falls within a certain range.

(Supplementary Note 13)

The object control method according to supplementary note 12, wherein the object includes two or more light sources, and the method further comprises controlling on/off of the two or more light sources in such a way that a change in light quantity between captured images due to an on/off change of the two or more light sources falls within a certain range.

(Supplementary Note 14)

An object recognition method comprising:

detecting, from a moving image of an imaged target object to be a recognition target, a state change of an object controlled by an object control device, and then specifying a captured image to be a recognition target, the object control device controlling an object being changeable in state within a capturing range of the moving image in such a way that a change in light quantity or hue between captured images due to a state change of the object falls within a certain range, the object control device controlling a state of the object, based on a detection result of the target object; and recognizing the target object included in the specified captured image.

(Supplementary Note 15)

The object recognition method according to supplementary note 14, wherein the object includes two or more light sources, and the method further comprises detecting on/off of the two or more light sources controlled in such a way that a change in light quantity between captured images due to an on/off change of the two or more light sources falls within a certain range, and then specifying the captured image.

(Supplementary Note 16)

A program which causes a computer to execute:

receiving processing of receiving a detection result of a target object to be a recognition target; and control processing of controlling a state of an object being changeable in state within a capturing range of the target object, based on the detection result, in such a way that a change in light quantity or hue between captured images due to a state change of the object falls within a certain range.

(Supplementary Note 17)

The program according to supplementary note 16, wherein the object includes two or more light sources, and the control processing is processing of controlling on/off of the two or more light sources in such a way that a change in light quantity between captured images due to an on/off change of the two or more light sources falls within a certain range.

(Supplementary Note 18)

A computer-readable non-transitory recording medium recording a program which causes a computer to execute:

specifying processing of detecting, from a moving image of an imaged target object to be a recognition target, a state change of an object controlled by an object control device, and then specifying a captured image to be a recognition target, the object control device controlling an object being changeable in state within a capturing range of the moving image in such a way that a change in light quantity or hue between captured images due to a state change of the object falls within a certain range, the object control device controlling a state of the object, based on a detection result of the target object; and recognition processing of recognizing the target object included in the specified captured image.

(Supplementary Note 19)

The recording medium according to supplementary note 18, wherein the object includes two or more light sources, and the specifying processing is processing of detecting on/off of the two or more light sources controlled in such a way that a change in light quantity between captured images due to an on/off change of the two or more light sources falls within a certain range, and then specifying the captured image.

This application is based upon and claims the benefit of priority from Japanese Patent Application No. 2016-132658, filed on Jul. 4, 2016, the disclosure of which is incorporated herein in its entirety by reference.

REFERENCE SIGNS LIST

10 Object recognition system
11 Detection unit
12 Imaging unit
13 Object
14 Control unit
15 Specifying unit
16 Recognition unit
80 Target object
90 Capturing range
100 Object recognition system
110 Detection device
120 Imaging device
130 Light source
131 Switch mechanism
140 Object control device
141 Receiving unit
142 Control unit
150 Object recognition device
151 Specifying unit
152 Recognition unit
153 Storage unit

The invention claimed is:

1. An object recognition system comprising:

a detector for detecting a moving target object; and a camera for capturing a moving image of the target object and an object, the object being changeable in state within a capturing range of the camera;

the object recognition system further comprising:

a memory storing therein a computer-program; and at least one processor to access the memory and execute the computer-program to implement:

controlling a state of the object, based on an output of the detector, in such a way that a change in light quantity or hue between captured images due to a state change of the object falls within a certain range;

detecting a state change of the object in the moving image, and then specifying a captured image to be a recognition target after the state change of the object is detected; and recognizing the target object included in the specified captured image.

2. The object recognition system according to claim 1, wherein the object includes two or more light sources, and the at least one processor executes the computer-program to implement:

controlling on/off of the two or more light sources in such a way that a change in light quantity between captured images due to an on/off change of the two or more light sources falls within a certain range.

3. The object recognition system according to claim 1, wherein the object is disposed in such a way as to be at a recognition start position of the captured image, and the at least one processor executes the computer-program to implement:

detecting a state change of the object at the recognition start position.

4. The object recognition system according to claim 1, wherein, the at least one processor executes the computer-program to implement:

when specifying the captured image, skipping detection of a state change of the object for a predetermined number of captured images from the specified captured image.

5. The object recognition system according to claim 1, wherein a number of the objects is three or more, and the at least one processor executes the computer-program to implement:

controlling a state of each of the three or more objects in such a way as to express a position of the target object in a captured image by a combination of state changes of the three or more objects.

6. An object recognition method in an object recognition system including a detector, a camera, an object being changeable in state within a capturing range of the camera, an object recognition device, and an object control device, the method comprising:

detecting a moving target object;

imaging a moving image of the target object;

controlling a state of the object, based on an output of the detector, in such a way that a change in light quantity or hue between captured images due to a state change of the object falls within a certain range;

detecting a state change of the object in the moving image, and then specifying a captured image to be a recognition target after the state change of the object is detected; and recognizing the target object included in the specified captured image.

7. The object recognition method according to claim 6, wherein the object includes two or more light sources, and the object control device controls on/off of the two or more light sources in such a way that a change in light quantity between captured images due to an on/off change of the two or more light sources falls within a certain range.

8. A non-transitory computer-readable recording medium recording a program which causes a computer to execute:

specifying processing of detecting, from a moving image of an imaged target object, a state change of an object controlled by an object control device, and then specifying a captured image to be a recognition target, the object control device controlling a state of the object, based on an output of the detector, in such a way that a change in light quantity or hue between captured images due to a state change of the object falls within a certain range, the object control device controlling a state of the object, based on a detection result of the target object;

detection processing of detecting a state change of the object in the moving image, and then specifying a captured image to be a recognition target after the state change of the object is detected; and recognition processing of recognizing the target object included in the specified captured image.

9. The recording medium according to claim 8, wherein the object includes two or more light sources, and the specifying processing is processing of detecting on/off of the two or more light sources controlled in such a way that a change in light quantity between captured images due to an on/off change of the two or more light sources falls within a certain range, and then specifying the captured image.

\* \* \* \* \*